United States Patent
Christiansen et al.

(10) Patent No.: US 11,953,589 B2
(45) Date of Patent: Apr. 9, 2024

(54) SYSTEM AND METHOD OF ASSISTED OR AUTOMATED GRAIN UNLOAD SYNCHRONIZATION

(71) Applicant: AGCO International GmbH, Neuhausen (CH)

(72) Inventors: Martin Peter Christiansen, Randers (DK); Ramon Buchaca Tarragona, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 362 days.

(21) Appl. No.: 17/377,304

(22) Filed: Jul. 15, 2021

(65) Prior Publication Data

US 2022/0018955 A1  Jan. 20, 2022

(30) Foreign Application Priority Data

Jul. 17, 2020 (GB) ...................................... 2011026

(51) Int. Cl.
*G01S 13/931* (2020.01)
*A01B 69/04* (2006.01)
(Continued)

(52) U.S. Cl.
CPC .......... *G01S 13/931* (2013.01); *A01B 69/008* (2013.01); *A01D 41/1278* (2013.01);
(Continued)

(58) Field of Classification Search
CPC ........ G01S 13/931; G01S 13/89; G01S 17/89; G01S 17/931; A01B 69/008;
(Continued)

(56) References Cited

U.S. PATENT DOCUMENTS

2010/0274452 A1* 10/2010 Ringwald ............ A01B 69/008
  701/50
2011/0061762 A1* 3/2011 Madsen ................. B65G 67/32
  141/94
(Continued)

FOREIGN PATENT DOCUMENTS

GB  2517049 A  2/2015
WO  2014/116819 A1  7/2014

OTHER PUBLICATIONS

Liu et al.; Grain Truck Loading Status Detection Based on Machine Vision; 2019 IEEE 4th International Conference on Image, Vision and Computing; pp. 40-44 (Year: 2019).*

(Continued)

*Primary Examiner* — Michael J Zanelli

(57) ABSTRACT

A system includes an agricultural harvester with an electromagnetic detecting and ranging module and a camera for capturing images of an area within a field of view of the electromagnetic detecting and ranging module. One or more computing devices detect the presence of an object using data from the electromagnetic detecting and ranging module, use image data from the camera to determine whether the object is a receiving vehicle and, if the object is a receiving vehicle, generate automated navigation data to automatically control operation of at least one of the agricultural harvester and the receiving vehicle to align an unload conveyor of the agricultural harvester with a grain bin of the receiving vehicle.

20 Claims, 21 Drawing Sheets

(51) Int. Cl.
    *A01D 41/127*     (2006.01)
    *A01D 90/10*     (2006.01)
    *B60W 60/00*     (2020.01)
    *G01F 23/292*     (2006.01)
    *G01S 13/89*     (2006.01)
    *G01S 17/89*     (2020.01)
    *G01S 17/931*     (2020.01)

(52) U.S. Cl.
    CPC ........... *A01D 90/10* (2013.01); *G01F 23/292* (2013.01); *G01S 13/89* (2013.01); *G01S 17/89* (2013.01); *G01S 17/931* (2020.01); *B60W 60/001* (2020.02)

(58) Field of Classification Search
    CPC .. A01D 41/1278; A01D 41/127; A01D 90/10; A01D 43/073; G01F 23/292; B60W 60/001
    See application file for complete search history.

(56) References Cited

U.S. PATENT DOCUMENTS

| | | |
|---|---|---|
| 2013/0211675 A1 | 8/2013 | Bonefas |
| 2014/0083556 A1 | 3/2014 | Darr et al. |
| 2014/0224377 A1 | 8/2014 | Bonefas |
| 2014/0311113 A1* | 10/2014 | Bonefas .................. A01D 75/02 56/10.2 R |
| 2014/0325422 A1 | 10/2014 | Madsen et al. |
| 2016/0249533 A1* | 9/2016 | Byttebier ............... A01D 90/10 701/50 |
| 2016/0323519 A1* | 11/2016 | Boydens ............ A01D 41/1217 |
| 2017/0055446 A1 | 3/2017 | Nykamp et al. |
| 2017/0147005 A1* | 5/2017 | Ramm .................. G05D 1/0295 |
| 2020/0128740 A1 | 4/2020 | Suleman |
| 2021/0333802 A1* | 10/2021 | Singh .................... B60W 10/20 |
| 2021/0337729 A1* | 11/2021 | O'Connor ............. B60W 10/30 |

OTHER PUBLICATIONS

UK Intellectual Property Office, Search Report for related UK Application No. 2011026.8, dated Jan. 14, 2021.
European Patent Office, Search Report for EP Application No. EP21185547.3, dated Nov. 26, 2021, 09 pages.

* cited by examiner

SYSTEM AND METHOD OF ASSISTED OR AUTOMATED GRAIN UNLOAD SYNCHRONIZATION

FIELD

Embodiments of the present invention relate to systems and methods for assisted or automatic synchronization of agricultural machine operations. More particularly, embodiments of the present invention relate to systems and methods for assisted or automatic synchronization of machine movement during transfer of crop material from one machine to another.

BACKGROUND

Combine harvesters are used in agricultural production to cut or pick up crops such as wheat, corn, beans and milo from a field and process the crop to remove grain from stalks, leaves and other material other than grain (MOG). Processing the crop involves gathering the crop into a crop processor, threshing the crop to loosen the grain from the MOG, separating the grain from the MOG and cleaning the grain. The combine harvester stores the clean grain in a clean grain tank and discharges the MOG from the harvester onto the field. The cleaned grain remains in the clean grain tank until it is transferred out of the tank through an unload conveyor into a receiving vehicle, such as a grain truck or a grain wagon pulled by a tractor.

To avoid frequent stops during a harvesting operation it is common to unload the grain from a harvester while the combine harvester is in motion harvesting crop. Unloading the harvester while it is in motion requires a receiving vehicle to drive alongside the combine harvester during the unload operation. This requires the operator driving the receiving vehicle to align a grain bin of the receiving vehicle with the spout of an unload conveyor of the combine for the duration of the unload operation. Aligning the two vehicles in this manner is laborious for the operator of the receiving vehicle and, in some situations, can be particularly challenging. Some circumstances may limit the operator's visibility, for example, such as where there is excessive dust in the air or at nighttime. Furthermore, if the receiving vehicle has a large or elongated grain bin, such as a large grain cart or a grain truck, it is desirable to shift the position of the grain bin relative to the spout during the unload operation to evenly fill the grain bin and avoid spilling grain.

Forage harvesters also process crop but function differently from combine harvesters. Rather than separating grain from MOG, forage harvesters chop the entire plant—including grain and MOG—into small pieces for storage and feeding to livestock. Forage harvesters do not store the processed crop onboard the harvester during the harvest operation, but rather transfer the processed crop to a receiving vehicle by blowing the crop material through a discharge chute to the receiving vehicle, such as a silage wagon pulled by a tractor, without storing it on the harvester. Thus, a receiving vehicle must closely follow the forage harvester during the entire harvester operation. This presents similar challenges to those discussed above in relation to the combine harvester.

The above section provides background information related to the present disclosure which is not necessarily prior art.

SUMMARY

A system according to a first embodiment of the invention comprises an agricultural harvester including a crop processor for reducing crop material to processed crop, an unload conveyor for transferring a stream of processed crop out of the agricultural harvester, an electromagnetic detecting and ranging module for detecting the location of an object relative to the agricultural harvester, and a camera for capturing images of an area within a field of view of the electromagnetic detecting and ranging module and generating image data. One or more computing devices are configured for receiving first data from the electromagnetic detecting and ranging module, the first data indicating the location of an object relative to the agricultural harvester, receiving image data from the camera, using the image data to determine whether the object is a receiving vehicle, and if the object is a receiving vehicle, generating automated navigation data based on the first data and the image data, the automated navigation data to automatically control operation of at least one of the agricultural harvester and the receiving vehicle to align the unload conveyor with a grain bin of the receiving vehicle.

A method according to another embodiment of the invention comprises detecting a location of an object relative to an agricultural harvester using an electromagnetic detecting and ranging module on the agricultural harvester; capturing images of an area within a field of view of the electromagnetic detecting and ranging module using a camera on the agricultural harvester and generating image data; receiving, using one or more computing devices, first data from the electromagnetic detecting and ranging module, the first data indicating the location of an object relative to the agricultural harvester; receiving, using the one or more computing devices, image data from the camera; processing, using the one or more computing devices, the image data to determine whether the object is a receiving vehicle; and if the object is a receiving vehicle generating, using the one or more computing devices, automated navigation data based on the first data and the image data, the automated navigation data to automatically control operation of at least one of the agricultural harvester and the receiving vehicle to align the unload conveyor with a grain bin of the receiving vehicle.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
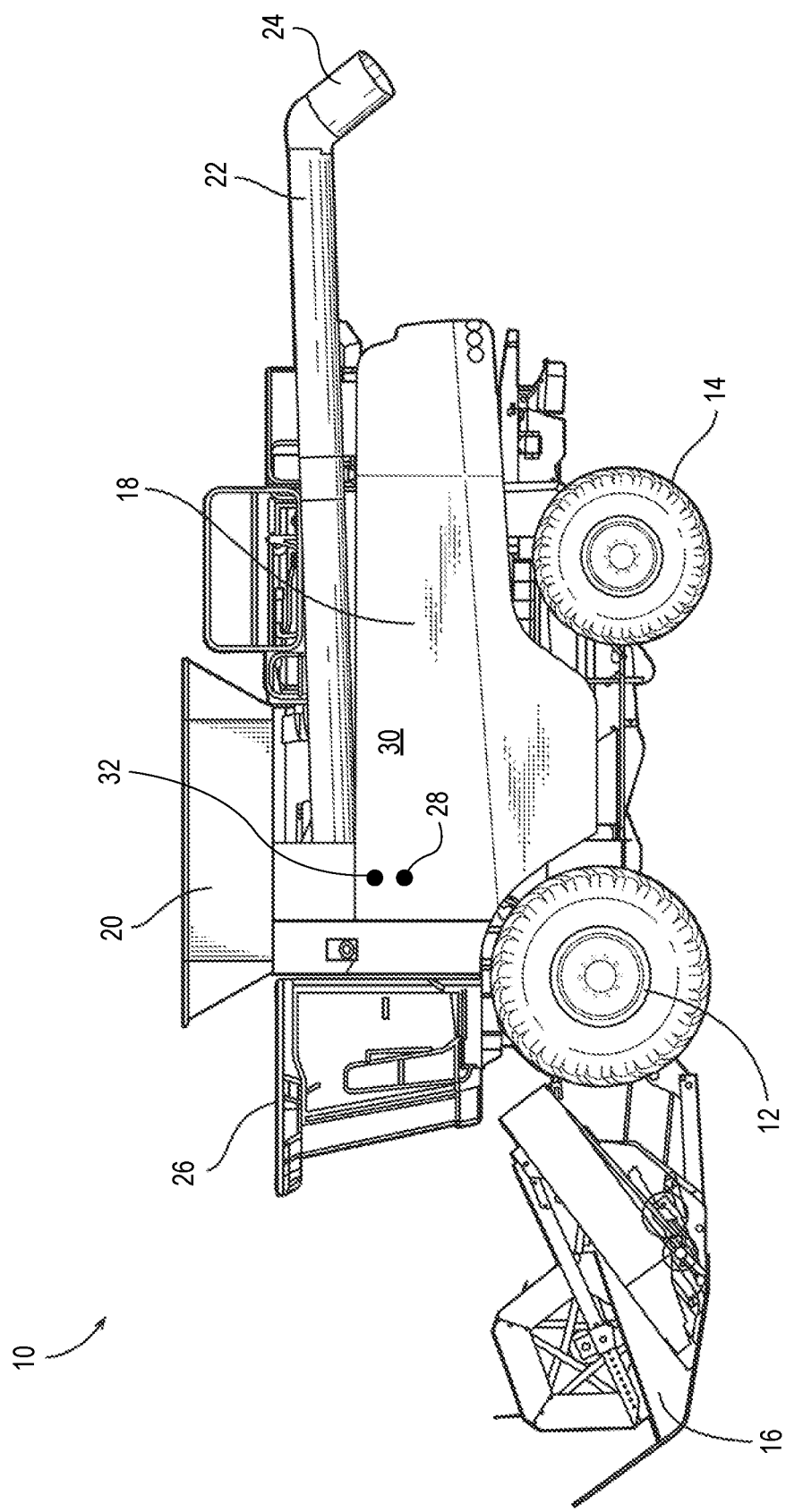
FIG. 1 is an agricultural harvester constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Given the challenges of synchronizing operation of harvesters and receiving vehicles during unload operations it is desirable to assist machine operators in manually controlling the machines or to fully automate movement of at least one of the harvester and the receiving vehicle to maintain the desired relative positions of the two vehicles. Assisting operation and fully automating movement of at least one of the machines in this way requires continuously generating position data, in real time or nearly in real time, indicating the relative positions of the machines. Generating and communicating position data presents various technical challenges that make it difficult to reliably acquire accurate position data. During harvest operations, for example, the machines operate in remote locations where data communications with external networks, such as the cellular communications network, are often limited or nonexistent; mountains or trees may limit the number of reliable GNSS satellite signals the machines can receive; harvesting environments are often dusty which can interfere with the operation of some types of sensors (such as optical sensors); harvesting operations may be performed at various times throughout the day (and even at nighttime) that present different and sometimes challenging ambient light situations that can limit the effectiveness of optical sensors; and harvesting operations may involve multiple harvesters and multiple receiving vehicles, wherein each harvester works with multiple receiving vehicles. Various embodiments of the present invention solve the problems associated with detecting the relative positions of the harvesters and receiving vehicles during unload operations and provide assisted or fully automated operation of at least one of the machines to synchronize movement during unload operations.

A system according to a first embodiment of the invention comprises an agricultural harvester, one or more computing devices and an electronic device with a graphical user interface. The agricultural harvester includes a crop processor for reducing crop material to processed crop, an unload conveyor for transferring processed crop out of the agricultural harvester, an electromagnetic detecting and ranging module for detecting a location of an object relative to the agricultural harvester, and a camera for capturing images of an area within a field of view of the electromagnetic detecting and ranging module and generating image data.

The one or more computing devices are configured for receiving first data from the electromagnetic detecting and ranging module, the first data indicating the location of the object relative to the agricultural harvester, receiving the image data from the camera, and using the image data to determine whether the object is a receiving vehicle. The electronic device includes a graphical user interface and is configured to receive the first data and the image data from the agricultural harvester, use the first data and the image data to generate a graphical representation illustrating the relative positions of the unload conveyor and the grain bin, and present the graphical representation on the graphical user interface.

Figure 2:
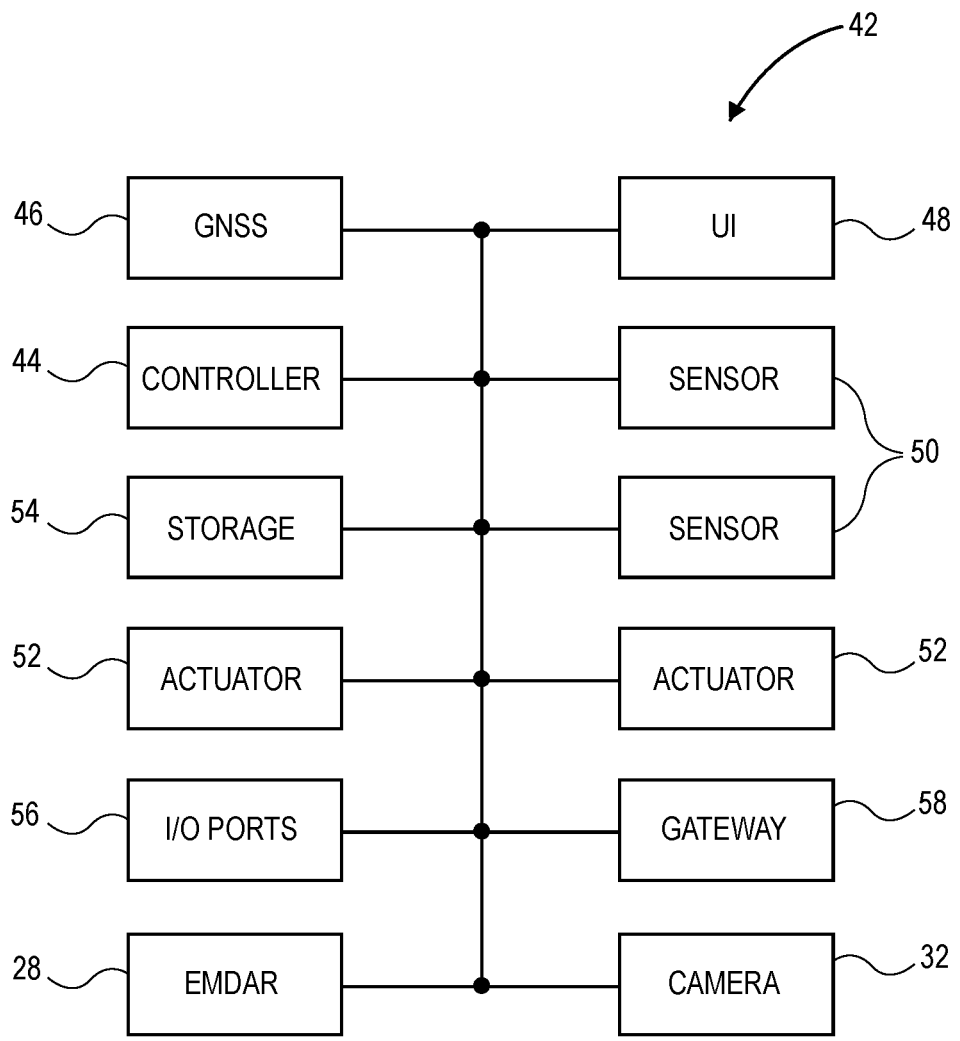
FIG. 2 is a block diagram of an electronic system of the agricultural harvester of FIG. 1.
Figure 3:
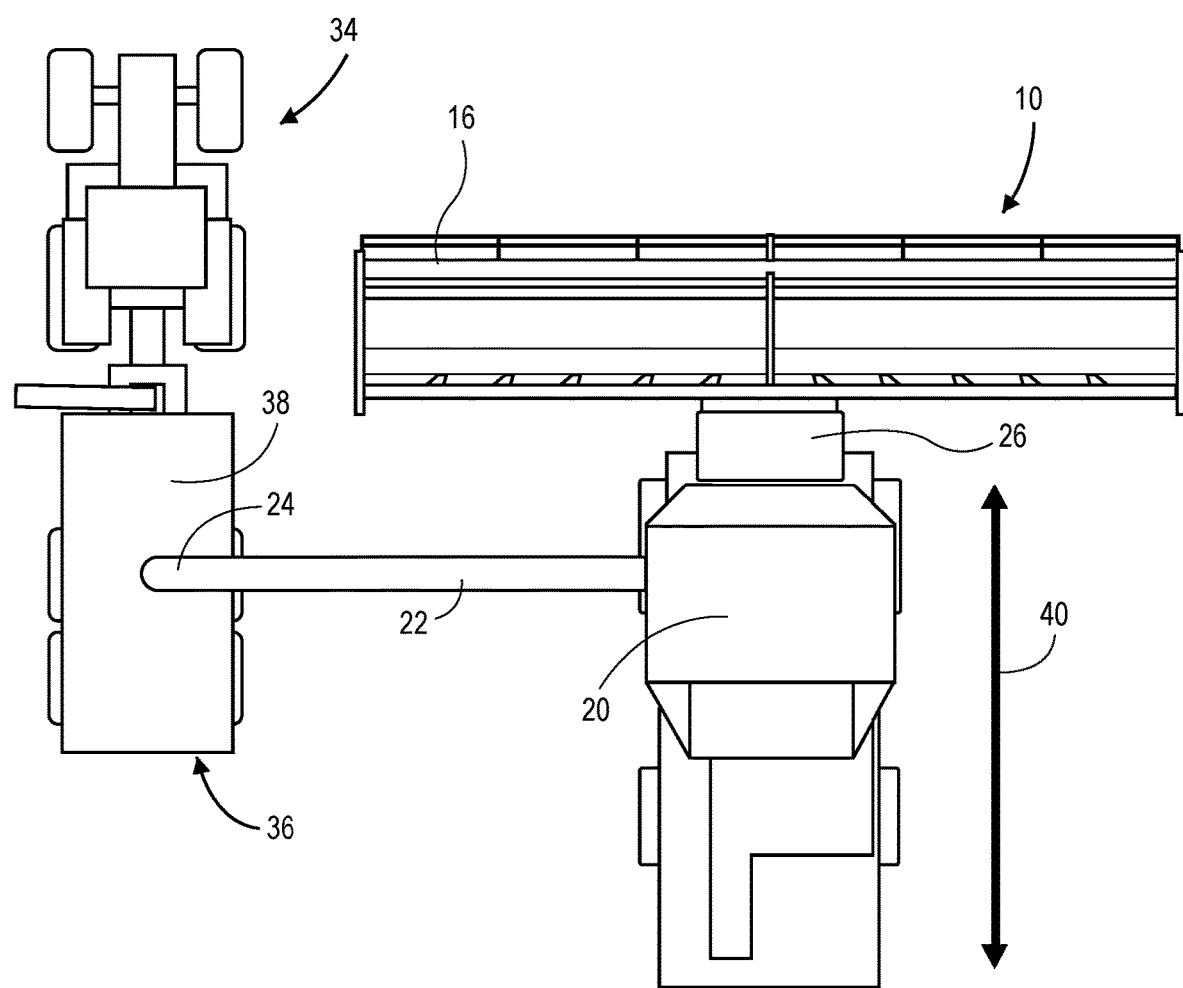
FIG. 3 is illustrates the agricultural harvester of FIG. 1 and a receiving vehicle, with the agricultural harvester in position to transfer grain to the receiving vehicle.

Turning now to the drawing figures, and initially FIGS. 1-3, an agricultural harvester 10 constructed in accordance with the first embodiment is illustrated. The harvester 10 is a combine harvester that cuts or picks up crop from a field, threshes the crop to loosen the grain from material other than grain (MOG), separates the grain from the MOG, cleans the grain, stores the clean grain in a clean grain tank and transfers the clean grain out of the clean grain tank to a receiving vehicle or other receptacle. The illustrated harvester 10 includes a pair of front wheels 12 and a pair of rear wheels 14 that support the harvester 10 on a ground surface, propel it along the ground surface and provide steering. A header 16 cuts crop standing in a field (or picks up crop that was previous cut) as the harvester 10 moves through the field and gathers the cut crop to be fed to a processor housed within a body 18 of the harvester 10.

The processor threshes the grain, separates the grain from the MOG, cleans the grain and stores the clean grain in a clean grain tank 20. Thus, the processor reduces crop material (plants or portions of plants cut or picked up from the field) to processed crop (grain). An unload conveyor 22 transfers grain from the clean grain tank 20 to a receiving vehicle or other receptacle using one or more augers, belts or similar mechanisms to move grain out of the clean grain tank 20, through the unload conveyor 22 and out a spout 24 positioned at an end of the unload conveyor 22 distal the body 18 of the harvester 10. The unload conveyor 22 is illustrated in a stowed position in FIG. 1 used when the harvester 10 is not transferring grain out of the grain tank 20. The unload conveyor 22 is moveable between the stowed position and a deployed position, illustrated in FIG. 3, used to transfer grain from the grain tank 20 to a receiving vehicle or other receptacle. The receiving vehicle illustrated in FIG. 3 is a tractor 34 and grain cart 36 combination. The grain cart 36 includes a grain bin 38 for holding crop transferred out of the harvester 10. When the unload conveyor 22 is in the deployed position it is generally perpendicular to a longitudinal axis of the harvester 10, the longitudinal axis being parallel with line 40 in FIG. 3. When the unload conveyor 22 is in the fully stowed position (FIG. 1) it is generally parallel with the longitudinal axis of the harvester.

An operator cabin 26 includes a seat and a user interface for enabling an operator to control various aspects of the harvester 10. The user interface includes mechanical components, electronic components, or both such as, for example, knobs, switches, levers, buttons, dials as well as electronic touchscreen displays that both present information to the operator in graphical form and receive information from the operator. The use interface is described further below as part of the electronic system 42 of the harvester 10.

The harvester 10 includes an electromagnetic detecting and ranging module 28 mounted on an exterior surface 30 of the combine body 18 and a camera 32 also mounted on the exterior surface 30. The electromagnetic detecting and ranging module 28 is configured and positioned for detecting the location of a receiving vehicle relative to the agricultural harvester. The camera 32 is positioned so that a field of view of the camera 32 at least partially overlaps a field of view of the module 32. In the embodiment illustrated in FIG. 1, the module 28 and the camera 32 are both mounted on the exterior surface 30 (being on the same side of the harvester 10 as the unload conveyor 22), between one meter and four meters from the ground, and proximate one another. In another embodiment of the invention, the module 28 and the camera 32 are both mounted on the surface 30 between one and one-half meters and three meters from the ground. It will be appreciated that the precise location of the module 28 and the camera 32 is not critical and that the module 28 and the camera 32 may be place in other, equally-preferred locations. By way of example, the module 28, the camera 32, or both may be placed on top of the operator cabin 26.

The harvester 10 includes an electronic system 42 illustrated in FIG. 2. The system 42 broadly includes a controller 44, a position determining device 46, a user interface 48, one or more sensors 50, one or more actuators 52, one or more storage components 54, one or more input/out ports 56, a communications gateway 58, the electromagnetic detecting and ranging module 28 and the camera 32.

The position determining device 46 includes a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The user interface 48 includes components for receiving information, instructions or other input from a user and may include buttons, switches, dials, and microphones, as well as components for presenting information or data to users, such as displays, light-emitting diodes, audio speakers and so forth. The user interface 48 may include one or more touchscreen displays capable of presenting visual representations of information or data and receiving instructions or input from the user via a single display surface.

The sensors 50 may be associated with any of various components or functions of the harvester 10 including, for example, various elements of the engine, transmission(s), and hydraulic and electrical systems. One or more of the sensors 50 may be configured and placed to detect environmental or ambient conditions in, around or near the harvester 10. Such environmental or ambient conditions may include temperature, humidity, wind speed and wind direction. The actuators 52 are configured and placed to drive certain functions of the harvester 10 including, for example, moving the unload conveyor 22 between the stowed and deployed positions, driving an auger or belt associated with the unload conveyor 22 and steering the rear wheels 14. The actuators 52 may take virtually any form but are generally configured to receive control signals or instructions from the controller 44 (or other component of the system 42) and to generate a mechanical movement or action in response to the control signals or instructions. By way of example, the sensors 50 and actuators 52 may be used in automated steering of the harvester 10 wherein the sensors 50 detect a current position or state of the steered wheels 14 and the actuators 52 drive steering action of the wheels 14. In another example, the sensors 50 collect data relating to the operation of the harvester 10 and store the data in the storage component 54, communicate the data to a remote computing device via the communications gateway 58, or both.

The controller 44 is a computing device and includes one or more integrated circuits programmed or configured to implement the functions described herein and associated with the harvester 10. By way of example the controller 44 may be a digital controller and may include one or more general purpose microprocessors or microcontrollers, programmable logic devices, application specific integrated circuits or other computing devices. The controller 44 may include multiple computing components or devices, such as electronic control units, placed in various different locations on the harvester 10, and may include one or more computing devices connected to the system 42 through the I/O ports 56. The controller 44 may also include one or more discrete and/or analog circuit components operating in conjunction with the one or more integrated circuits or computing components. Furthermore, the controller 44 may include or have access to one or more memory elements operable to store executable instructions, data, or both. The storage component 54 stores data and preferably includes a non-volatile storage medium such as solid state, optic or magnetic technology. The communications gateway 58 includes one or more wireless transceivers configured to communicate according to one or more wireless communications protocols or standards, such as one or more of protocols based on the IEEE 802.11 family of standards ("Wi-Fi"), the Bluetooth wireless communications standard, a 433 MHz wireless communications protocol or a protocol for communicating over a cellular telephone network. Alternatively or additionally, the communications gateway 58 may include one or more wireless transceivers configured to communicate according to one or more proprietary or non-standardized wireless communication technologies or protocols, such as proprietary wireless communications protocols using 2.4 GHz or 5 GHz radio signals. Thus, the communications gateway 58 enables wireless communications with other machines such as other harvesters or tractors, with external devices such as laptop or tablet computers or smartphones, and with external communications networks such as a cellular telephone network or Wi-Fi network.

It will be appreciated that, for simplicity, certain elements and components of the system 42 have been omitted from the present discussion and from the diagram illustrated in FIG. 2. A power source or power connector is also associated with the system 42, for example, but is conventional in nature and, therefore, is not discussed herein.

In the illustrated embodiment all of the components of the system 42 are contained on or in the harvester 10. The present invention is not so limited, however, and in other embodiments one or more of the components of the system 42 may be external to the harvester 10. In some embodiments, for example, some of the components of the system 42 are contained on or in the harvester 10 while other components of the system are contained on or in an implement associated with the harvester 10. In those embodiments, the components associated with the harvester 10 and the components associated with the implement may communicate via wired or wireless communications according to a local area network such as, for example, a controller area network. The system may be part of a communications and control system conforming to the ISO 11783 (also referred to as "ISOBUS") standard. In some embodiments, one or more components of the system 42 may be located separately or remotely from the harvester 10 and any implements associated with the harvester 10. In those embodiments, the system 42 may include wireless communications components (e.g., the gateway 58) for enabling the harvester 10 to communicate with another machine or a remote computer, computer network or system. It may be desirable, for example, to use one or more computing devices external to the harvester 10 to determine, or assist in determining, the location of a receiving vehicle, a fill level of the receiving vehicle and/or the distribution of processed crop in the receiving vehicle, as explained below.

In the first embodiment the one or more computing devices has reference to the controller 44, including multiple devices that, taken together, may constitute the controller 44 as explained above. It will be appreciated, though, that in other embodiments the one or more computing devices may be separate from, but in communication with, the harvester 10. In those embodiments the one or more computing devices may include computing devices associated with a portable electronic device, such as a laptop computer, a tablet computer or a smartphone, may include computing devices embedded in another agricultural machine, such as a receiving vehicle, or both. Furthermore, in some embodiments the one or more computing devices may include computing devices from multiple machines or devices, such as a computing device on the harvester 10 and a computing device on or in a receiving vehicle. By way of example, a computing device on the harvester 10 may receive and process data from the modules 28 and 32 to generate location information and may communicate the location information to the tractor 34 via the communications gateway 58, wherein another computing device on the tractor 34 generates automated guidance data for guiding the tractor 34 or generates graphic data for presentation on a user interface in the tractor 34. In that scenario the one or more computing devices comprise both the computing device on the harvester 10 and the computing device on the tractor 34.

The tractor 34 also includes an electronic system similar to the system 42 of the harvester 10, except that the electronic system of the tractor 34 does not include electromagnetic detecting and ranging module 28 or the camera 32. The electronic system of the tractor 34 broadly includes a controller, a position determining device, a user interface, one or more sensors, one or more actuators, one or more storage components, one or more input/out ports a communications gateway similar or identical to those described above as part of the system 42.

The electromagnetic detecting and ranging modules 28 uses reflected electromagnet waves to generate a digital representation of objects within a field of view of the module 28. More particularly, the module 28 includes an emitter for emitting electromagnetic waves and a sensor for detecting reflected waves. Data generated by the sensor includes such information as an angle and a distance for each data point that indicate a point in space where the wave encountered and reflected off of an object. Thus, the digital representation generated by the module 28 includes distances to and relative locations of objects and surfaces within the field of view. Technologies that may be used in the module 28 include LiDAR and RADAR.

Light detecting and ranging (LiDAR) is a method for measuring distances (ranging) by illuminating the target with laser light and measuring the reflection with a sensor. Differences in laser return times and wavelengths can then be used to make digital three-dimensional or two-dimensional representations of the area scanned. LiDAR may use ultraviolet, visible, or near infrared light to image objects and can target a wide range of materials, including metallic and non-metallic objects.

Radio detecting and ranging (RADAR) is a detection system that uses radio waves to determine the range, angle, and/or velocity of objects. A RADAR system includes a transmitter producing electromagnetic waves in the radio or microwave domains, a transmitting antenna, a receiving antenna (often the same antenna is used for transmitting and receiving) and a receiver and processor to determine properties of the object(s) within the scan zone of the system. Radio waves (pulsed or continuous) from the transmitter reflect off the object and return to the receiver, giving information about the object's location, direction of travel and speed.

The electromagnetic detecting and ranging module 28 collects data that defines a digital representation of the area within the field of view of the module 28 and communicates that data to the controller 44. The data collected by the module 28 includes location information for each of a plurality of points making up a point cloud. The location information is relative to the module 28 or 32 generating the data and may include a set of two-dimensional Cartesian coordinates, such as X and Y coordinates of the point relative to the module 28 or 32; a set of three-dimensional Cartesian coordinates such as X, Y and Z coordinates; a set of polar coordinates such as a radial coordinate (r) indicating a distance from the module 28 or 32 and an angular coordinate ($\theta$) indicating an angle from a reference direction; a set of spherical coordinates such as a radial coordinate (r) indicating a distance of the point from the module 28 or 32, a polar angle coordinate ($\theta$) measured from a fixed zenith direction, and an azimuthal angle coordinate ($\varphi$) of its orthogonal projection on a reference plane that passes through the origin and is orthogonal to the zenith, measured from a fixed reference direction on that plane; or a set of cylindrical coordinates such as a distance (r) to the point from a reference axis (typically corresponding to a location of the module 28 or 32), a direction ($\varphi$) from the reference axis, and a distance (Z) from a reference plane that is perpendicular to the reference axis.

Figure 4:
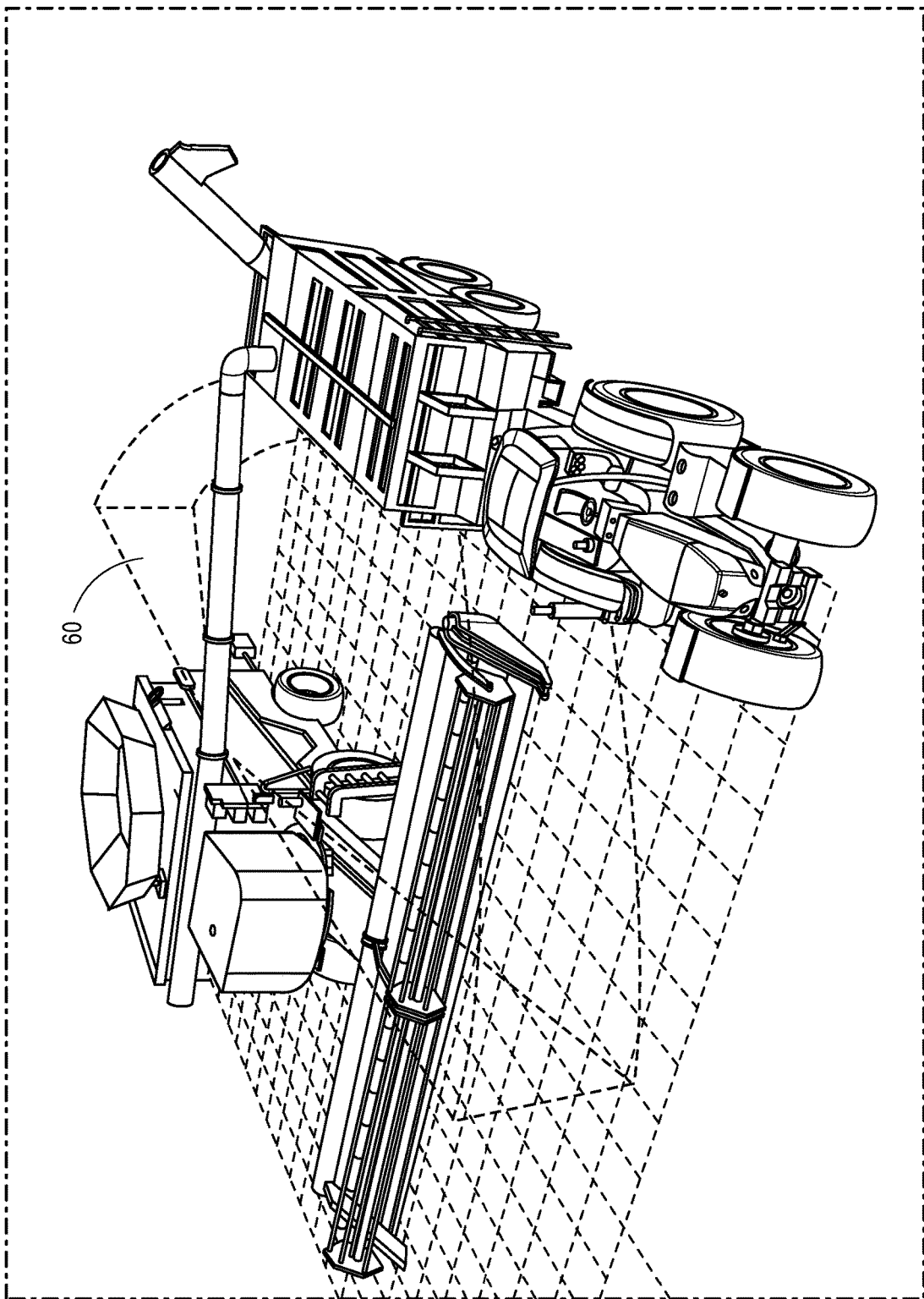
FIG. 4 is a perspective view of the agricultural harvester and receiving vehicle of FIG. 3 illustrating a scan area of a first electromagnetic detecting and ranging module on the agricultural harvester.

The electromagnetic detecting and ranging module 28 is positioned and configured for detecting the location of a receiving vehicle relative to the agricultural harvester 10. The electromagnetic detecting and ranging module 28 is located on the exterior side surface 30 of the body 18 of the harvester 10. It includes a three-dimensional light detecting and ranging (LiDAR) scanner positioned to scan an area extending outwardly from the side surface 30 and with a center of the scan area being perpendicular or approximately perpendicular to the longitudinal axis of the harvester 10. This corresponds to an area in which a receiving vehicle is located during crop transfer operations. FIG. 4 illustrates a scan area 60 of the module 28 with the tractor 34 and the grain cart 36 within the scan area 60. As explained above, the module 28 generates a plurality of data points constituting a point cloud representative of points on surfaces within the scan area 60, including points on surfaces of the grain cart 36, the tractor 34 pulling the grain cart 36, the ground and other objects within the scan area 60.

Figure 5:
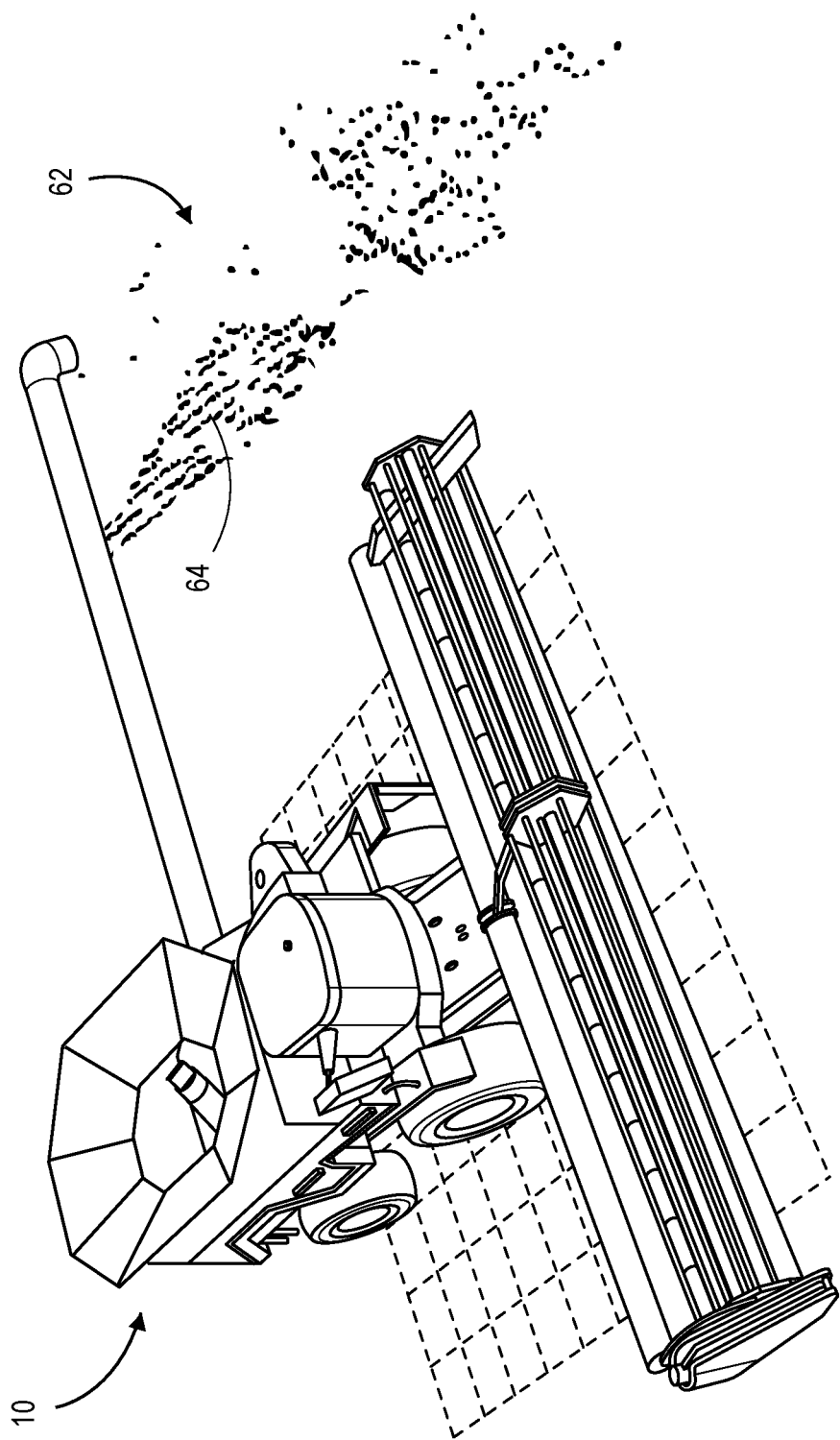
FIG. 5 is a perspective view of the agricultural harvester of FIG. 1 illustrating data points collected by the first electromagnetic detecting and ranging module.

A portion of a point cloud 62 is depicted in FIG. 5 illustrating some of the data points generated by the module 28 and corresponding to the grain cart 36 and the tractor 34. The one or more computing devices receive the data generated by the module 28 and use the data to detect the presence of the grain cart 36 (or other receiving vehicle) and to determine the location of the grain cart 36 relative to the harvester 10. To detect the presence of the grain cart 36 the one or more computing devices process the data received from the module 28 to determine whether one or more features or characteristics of the grain cart 36 are present in the data. The point cloud 62 depicted in FIG. 5, for example, illustrates various features of the grain cart 36 that may be reflected in the data collected by the module 28. A pattern 64 in the point cloud 62 corresponding to an exterior side surface of the grain cart 36 is visible including a front edge, a top edge, a rear edge and a bottom edge of the surface 64. The one or more computing devices process the data to identify the presence of a surface that approximately matches the anticipated shape, size, angle and/or location of a surface of the grain cart 36. It does this by looking for a pattern in the point cloud corresponding to a flat surface. Once it detects a flat surface it processes the data to identify additional features or patterns that correspond to a receiving vehicle, such as a total length of the surface, a total height of the surface, a particular length-to-height ratio of the surface or another pattern indicating another feature or characteristic of the grain cart such as a circular pattern indicating a wheel. The one or more computing devices may use preexisting data sets corresponding to the particular receiving vehicle to identify patterns from the data acquired by the electromagnetic detecting and ranging module 28, as explained below. The one or more computing devices use the data from the module 28 to determine the orientation and the dimensions of the receiving vehicle. Using data from the point cloud 62, for example, the one or more computing devices determine whether the surface corresponding to the size of the grain cart 36 is parallel with the harvester 10 (that is, a front portion of the grain cart is approximately the same distance from the module 28 as a rear portion), or whether a front portion of the grain cart 36 is further from or closer to the module 28 than a rear portion of the grain cart 36. The one or more computing devices can use the orientation of the grain cart 36 to determine, for example, if the grain cart 36 is following parallel with the harvester 10 or is separating from the harvester 10. The one or more computing devices determine the dimensions (or approximate dimensions) of the grain cart 36 by identifying a front edge, rear edge and top edge of the point cloud 62. The one or more computing devices may use the dimensions of the grain cart 36 in determining where the spout 24 of the unload conveyor 22 is located relative to the edges of grain bin 38 to accurately generate a graphical depiction of the relative positions of the unload conveyor 22 and the grain cart 36 and present the graphical depiction on a graphical user interface, as explained below. In some embodiments, the one or more computing devices use the dimensions of the grain cart 36 to determine where the spout 24 of the unload conveyor 22 is located relative to the edges of grain bin 38 in automatically controlling grain transfer to only transfer grain from the harvester 10 to the grain cart 36 while the spout 24 is over the grain bin 38.

Once the one or more computing devices have identified the patterns and features in the point cloud sufficiently to determine that the object is the grain cart 36, the one or more computing devices use data from the module 28 to determine and track the location of the grain cart 36 relative to the harvester 10. Tracking the location of the grain cart 36 relative to the harvester 10 may involve determining two variables—the lateral distance of the grain cart 36 from the harvester 10 and the longitudinal offset of the grain cart relative to the harvester 10.

Each of the data points making up the point cloud 62 includes a distance value indicating a distance from the module 28, therefore determining the lateral distance of the grain cart 36 from the harvester 10 involves using the distance values of the relevant points in the point cloud 62, such as the points defining the pattern 64 corresponding to the exterior surface of the grain cart 36. If the average distance of to the data points corresponding to the surface is six meters, for example, the lateral distance of the grain cart 36 from the harvester 10 is six meters.

To determine the longitudinal offset of the grain cart 36 from the harvester 10 the one or more computing devices determine the location of one or more features of the grain cart 36 within the field of view of the module 28 and, in particular, whether the feature(s) is to the left or to the right of a center of the scan area of the module 28. If the center of the exterior surface of the grain cart 36 is determined to be at the center of the field of view of the module 28, for example, the grain cart 36 is determined to have a longitudinal offset of zero. If the center of the exterior surface of the grain cart 36 is determined to be ten degrees to the left of the center of the field of view, the grain cart 36 has a negative longitudinal offset corresponding to a distance that is determined using the lateral distance and the angle of ten degrees. If the center of the exterior surface of the grain cart 36 is determined to be ten degrees to the right of the center of the field of view, the grain cart 36 has a positive longitudinal offset corresponding to a distance that is determined using the lateral distance and the angle of ten degrees.

The camera 32 is positioned and configured for capturing images of objects that are within the field of view of the module 28. The camera 32 is located on the exterior side surface 30 of the body 18 of the harvester 10, as explained above, and has a field of view extending outwardly from the side surface 30 and with a center of the field of view being perpendicular or approximately perpendicular to the longitudinal axis of the harvester 10. This corresponds to an area in which a receiving vehicle is located during crop transfer operations. The field of view of the camera 32 at least partially overlaps the scan area (field of view) of the module 28.

Figure 7:
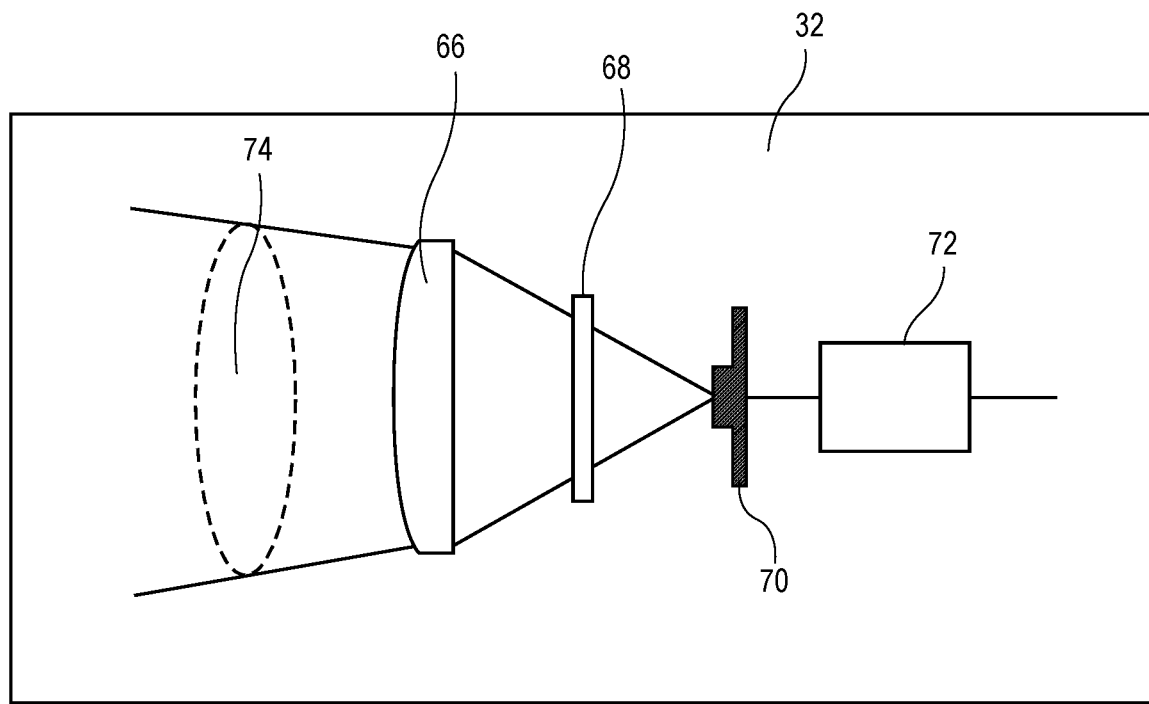
FIG. 7 is a block diagram of certain components of a camera used on the harvester of FIG. 1.

A diagram of certain components of the camera 32 is illustrated in FIG. 7 and includes one or more lenses 66, an optional filter 68, a detector 70, and processing circuitry 72. The one or more lenses collect and direct light from a field of view 74 through the filter 68 to the detector 70 and serve to focus and/or magnify images. The filter 68 passes select spectral bands such as ultraviolet, infrared or other bands. In some embodiments the camera 32 does not have a filter 68. The detector 70 is a digital image sensor that converts electromagnetic energy to an electric signal and employs image sensing technology such as charge-coupled device (CCD) technology and/or complementary metal oxide semiconductor (CMOS) technology. The processing circuitry 72 includes circuitry for amplifying and processing the electric signal generated by the detector 70 to generated image data, which his passed to the one or more computing devices such as the controller 44.

Figure 8:
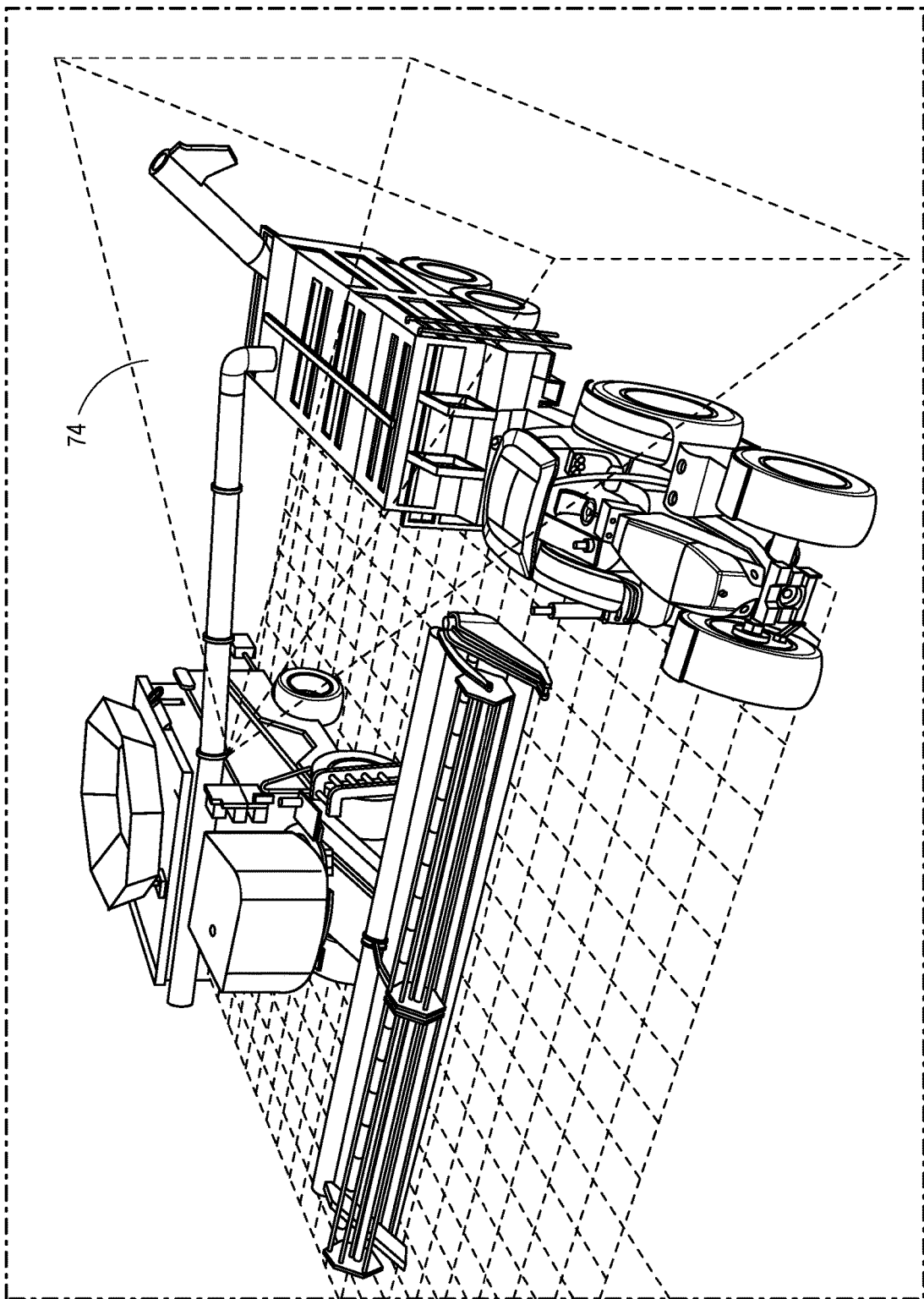
FIG. 8 is a perspective view of the agricultural harvester and receiving vehicle of FIG. 3 illustrating a field of view of the camera of FIG. 7.

The field of view 74 of the camera 32 relative to the harvester 10 and the grain cart is illustrated in FIG. 8 and at least partially overlaps with the field of view 60 of the module 28 (FIG. 8). The camera 32 requires an external light source such as natural ambient light or an artificial light source such as a light mounted on the harvester 10 or the receiving vehicle. The camera 32 or the harvester 10 may include a dedicated light source that is configured and used specifically for capturing images with the camera 32.

Figure 9:
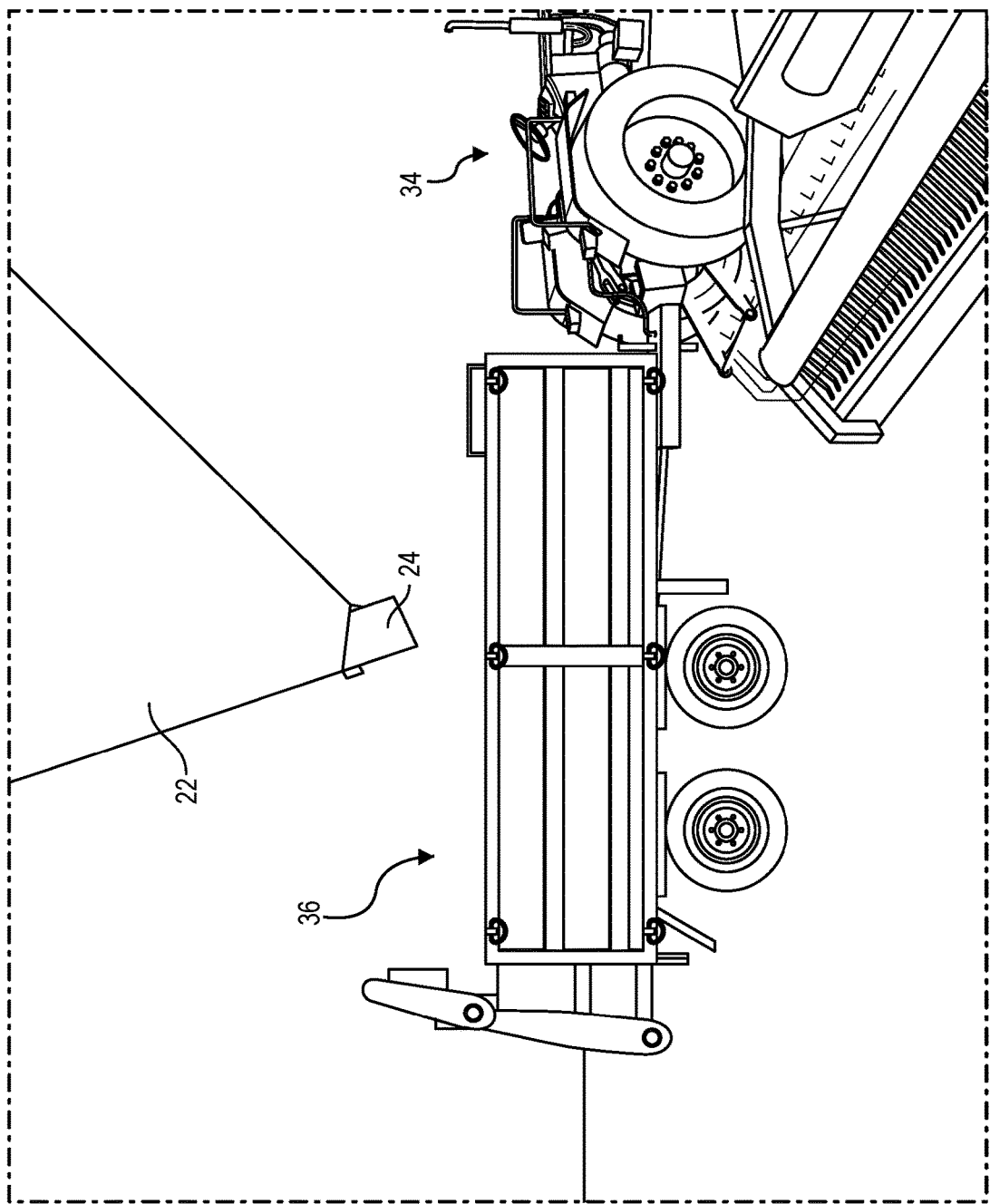
FIG. 9 is a depiction of an image captured by the camera of FIG. 7 when mounted the harvester of FIG. 1.

An exemplary image taken from the camera 32 is illustrated in FIG. 9 and includes the tractor 34 and grain cart 36. The unload conveyor 22 and spout 24 are also visible in the image. Image data generated by the camera 32 is used by the one or more computing devices to determine whether a receiving vehicle is present in the image. In the image illustrated in FIG. 9 the grain cart 36 is visible so the one or more computing devices confirms the presence of the grain cart in the field of view of the module 28.

During a harvest operation, the one or more computing devices continuously or periodically receive data from the module 28 and the camera 32, and use the data to detect the presence of the receiving vehicle and to determine the location of the receiving vehicle relative to the harvester 10. In an exemplary scenario, the one or more computing devices receives and processes data from the module 28 looking for patterns in the data that reflect the presence of a large object approximately the size of the receiving vehicle. Once the one or more computing devices detect such a pattern it reviews image data captured by the camera 32 to determine whether a receiving vehicle is within the field of view of the module 28. If so, the one or more computing devices use the data generated by the module 28 to determine the location of the receiving vehicle. In another exemplary scenario the one or more computing devices receives data from both the module 28 and the camera 32 and processes data from both sources looking for patterns that reflect the presence of a receiving vehicle. Once such a pattern is detected from either source the one or more computing devices use data from the other source to confirm the presence of the receiving vehicle.

The one or more computing devices use the location of the receiving vehicle relative to the harvester 10 to generate a graphic representation of at least portions of the harvester 10 and the receiving vehicle that illustrate, in an intuitive way, the relative positions of the unload conveyor 22 and the grain bin of the receiving vehicle. The graphic representation is presented on a graphical user interface in the operator cabin of the tractor (or the harvester 10), typically located toward the front or side of the operator when he or she is facing forward, thereby allowing the operator to see the position of the grain bin relative to the unload auger and steer the tractor so that the grain bin is located beneath the spout of the unload conveyor. This relieves the operator(s) of the need to try to look backward to see the position of the unload conveyor while also watching the field ahead of the machine. The graphical representation has the further advantage of enabling the operator(s) to see the relative positions of the machines even in situations with limited visibility outside the operator cabin.

The one or more computing devices may detect patterns in the data generated by the module 28 and by the camera 32 by comparing it with preexisting data corresponding to the receiving vehicle. The preexisting data is collected by the module 28 and camera 32 (or similar devices), or is generated by other sensors or a computer to simulate such data, and provides the one or more computing devices known data and image patterns corresponding to the receiving vehicle. During operation the one or more computing devices compare the data generated by the module 28 with the preexisting data to identify such patterns as the exterior side surface of the grain cart, edges of the grain cart, wheels of the grain cart or features of the tractor such as the rear and front wheels or an operator cabin. Similarly, during operation the one or more computing devices compare the image data generated by the camera 32 with the preexisting data to identify preexisting image data that corresponds to the data generated by the camera 32.

Figure 6:
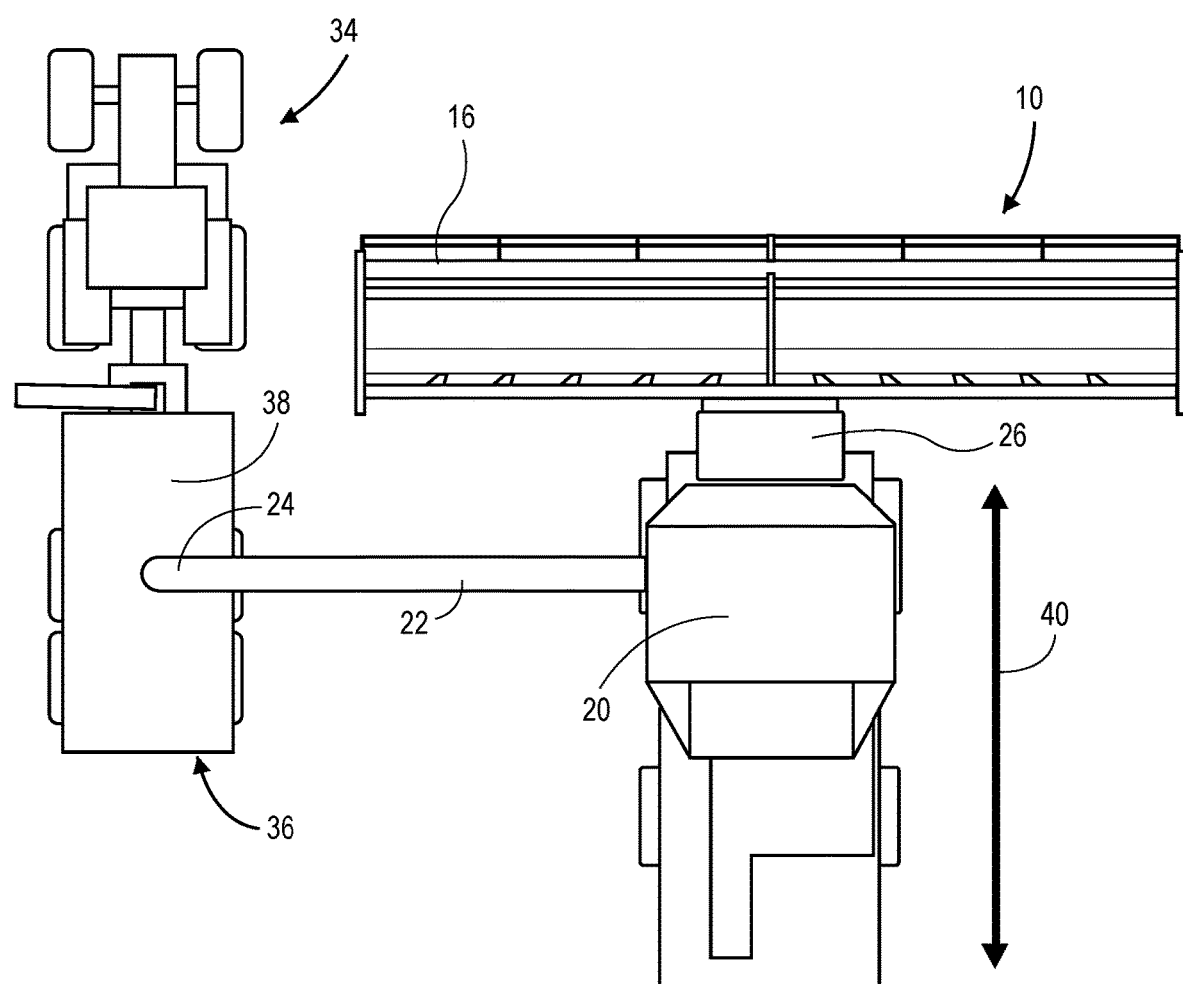
FIG. 6 illustrates movement of the agricultural harvester relative to the receiving vehicle during a process of collecting data from the electromagnetic detecting and ranging sensor.

The preexisting data may be provided by a machine manufacturer or may be captured using the harvester 10 and the receiving vehicle. FIG. 6 illustrates the position and movement of the harvester 10 relative to a receiving vehicle during a process of capturing image data using the camera 32 and electromagnetic detecting and ranging data using the module 28. The harvester 10 is positioned to the side of and behind the grain cart 36 when data capture begins. The harvester 10 is gradually moved forward relative to the grain cart 36 until it reaches a second position to the side of and in front of the grain cart 36. The module 28 and camera 32 capture data during the operation and store the data for use in pattern recognition. This process may be repeated multiple times with the receiving vehicle at different lateral distances from, and different angles to, the harvester 10.

Data from the electromagnetic detecting and ranging module 28, from the camera 32, or both may be used to detect the position of the unload conveyor 22 and, in particular, whether the unload conveyor 22 is in a deployed position as illustrated in FIG. 3. To determine whether the unload conveyor 22 is in the deployed position, the one or more computing devices process the data to determine whether it includes patterns corresponding to the unload auger 22.

The one or more computing devices use the data generated by the module 28 and the camera 32 to generate graphic data defining a graphical representation illustrating the relative positions of the unload conveyor 22 and the grain bin 38. This graphical representation assists an operator in manually guiding either the tractor 34 or the harvester 10 to align the unload conveyor 22 with the grain bin 38.

The graphical representation may be presented on the user interface 48 of the harvester 10, on a user interface of the tractor 34, on a user interface of a portable electronic device such as a table computer or a smartphone, or on any combination thereof. As depicted in a first diagram of FIG. 10 the harvester 10 may be in wireless communication with the receiving vehicle wherein a computing device on the harvester 10 generates and communicates the graphical representation to the receiving vehicle as a wireless communication. The tractor includes an electronic system similar to that of the harvester 10 and illustrated in FIG. 2, as explained above, including a wireless gateway, a controller and a user interface. The harvester 10 communicates the graphic data via the wireless gateway of the harvester 10 and the tractor receives the graphic data via the wireless gateway of the tractor 34, wherein the user interface on the tractor 34 generates the graphical representation from the graphic data and presents the graphical representation to the operator on the user interface.

Figure 10:
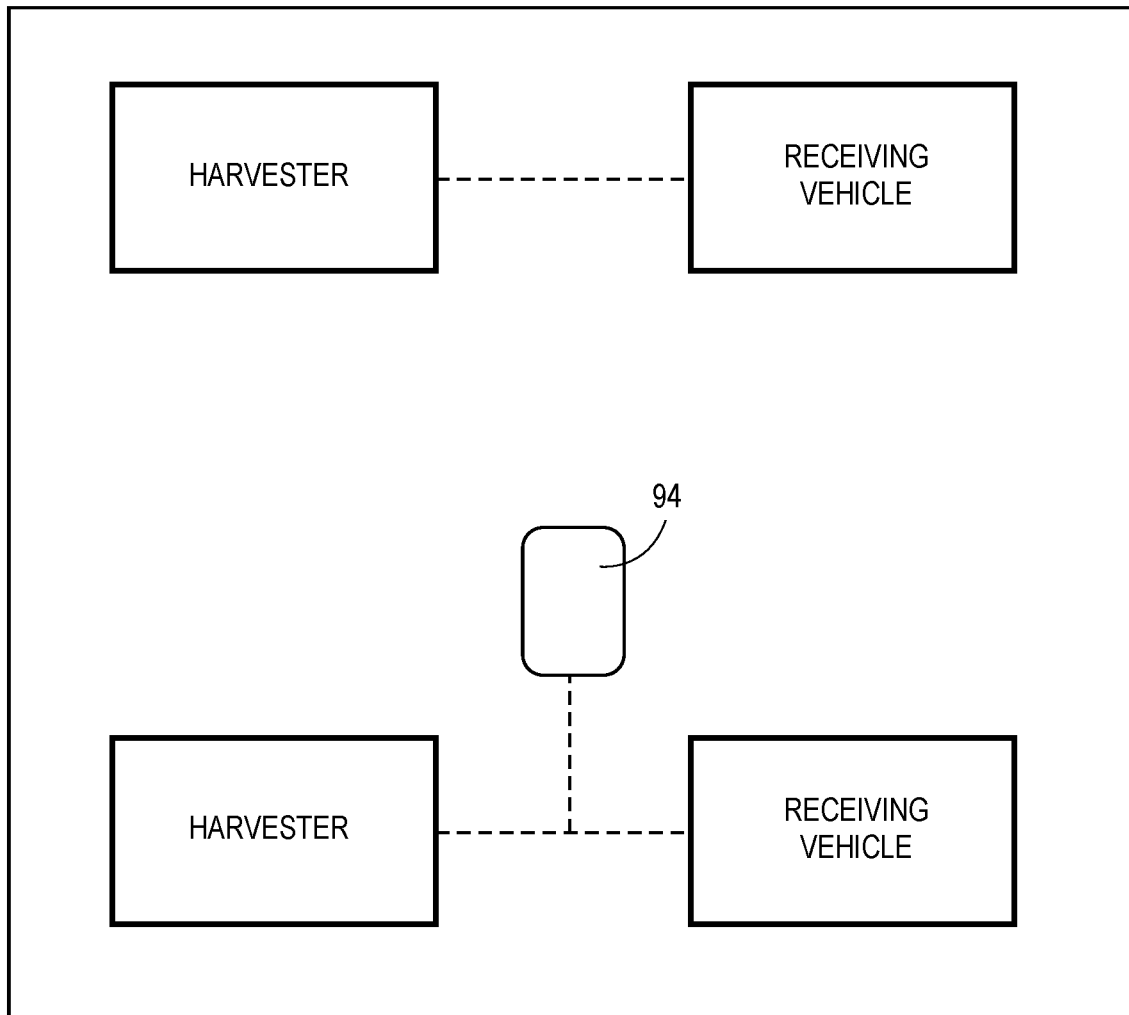
FIG. 10 is a diagram illustrating an embodiment wherein the agricultural harvester shares data wirelessly with the receiving vehicle and another embodiment wherein the agricultural harvester shares data wirelessly with the receiving vehicle and a portable electronic device.

As depicted in a second diagram of FIG. 10 the harvester may be in wireless communication with the receiving vehicle and with a portable electronic device 94 wherein a computing device on the harvester 10 generates and communicates the graphical representation to the receiving vehicle, to the portable electronic device, or both as a wireless communication. The portable electronic device 94 may be placed in the operator cabin 26 of the harvester 10, in the operator cabin of the tractor 34, or another location that is not in the harvester 10 or in the tractor 34. The portable electronic device 94 receives the graphic data from the harvester 10 through a wireless transceiver on the portable electronic device.

Figure 11:
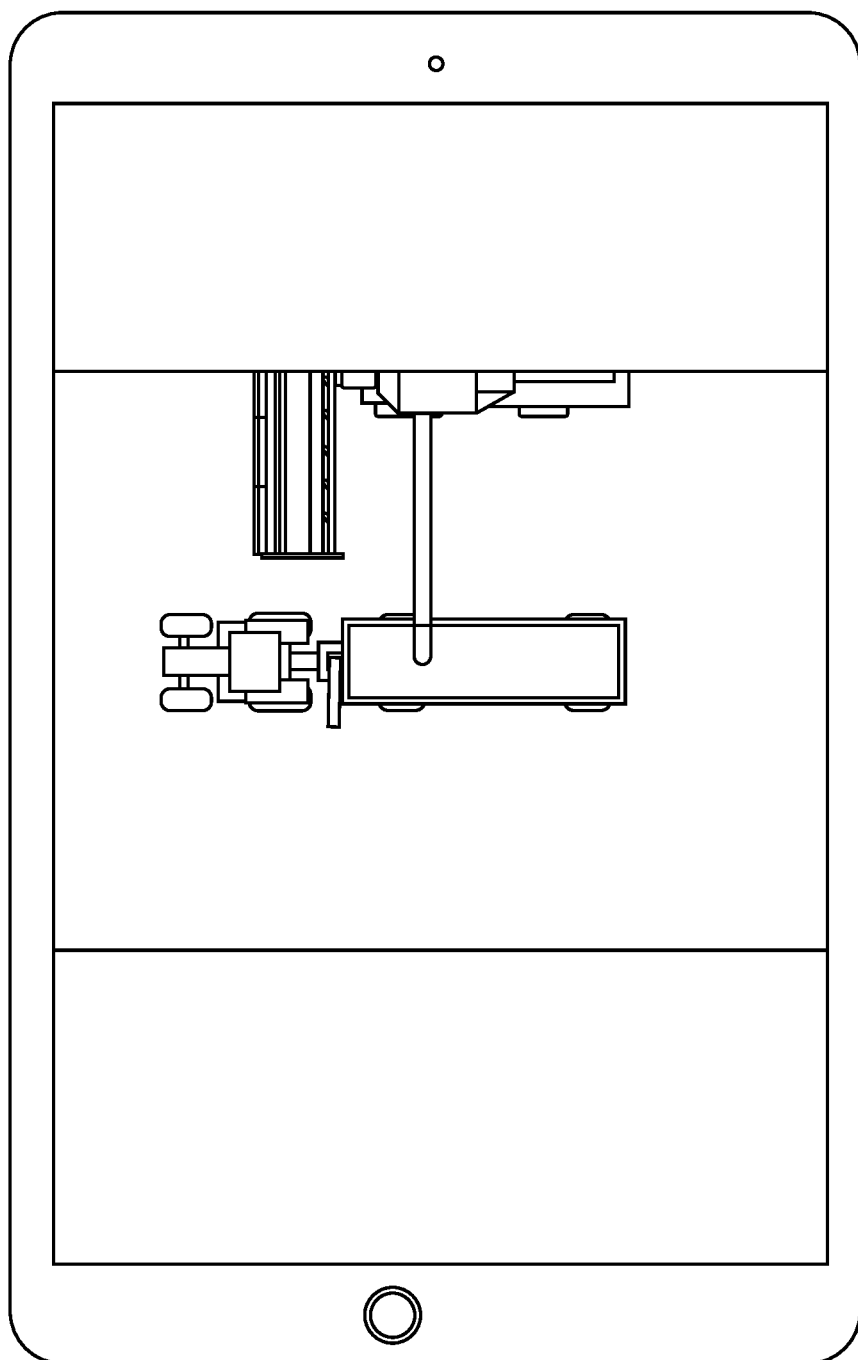
FIG. 11 illustrates a first graphical user interface including a graphical representation of the relative positions of the agricultural harvester and the receiving vehicle.
Figure 12:
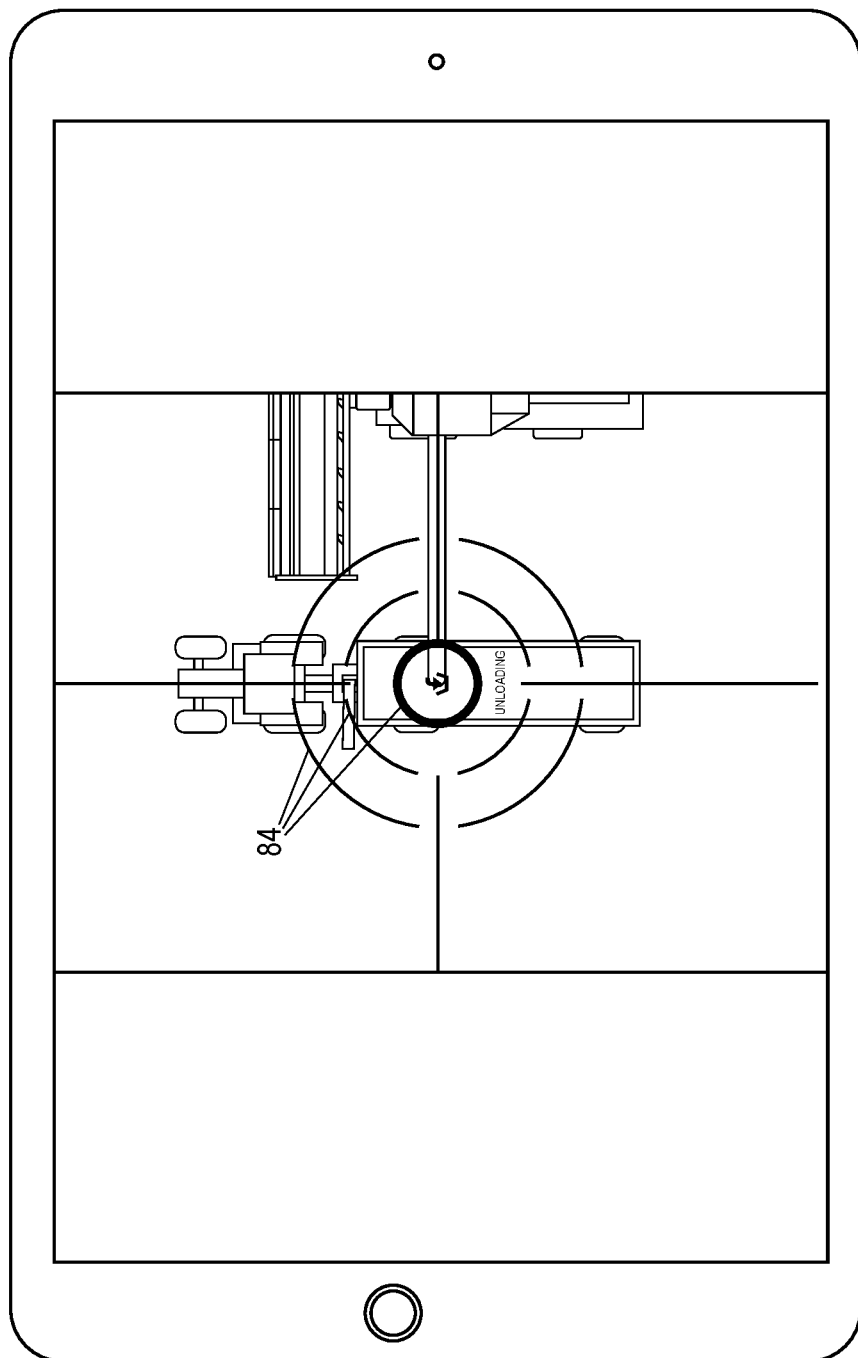
FIG. 12 illustrates a second graphical user interface including a graphical representation of the relative positions of the agricultural harvester and the receiving vehicle.

The graphical representation is presented as part of a graphical user interface on a portable electronic device in FIGS. 11 and 12 for illustration purposes, with the understanding that the graphical representation may be presented on a display that is part of a display console in the receiving vehicle or in the harvester 10. The graphical representation of the grain cart 36, the harvester 10 and their relative positions enables the operator of the tractor 34 to guide the tractor to a location relative to the harvester 10 where the grain bin 38 of the grain cart 36 is properly aligned with the unload auger 22. The grain cart 36 and the harvester 10 are depicted in plan view (that is, from a perspective directly above the machines and looking down) so that the operator can clearly see from the graphic representation the relative positions of the grain cart and the harvester 10.

FIG. 12 depicts an alternative implementation of the graphical representation similar to that of FIG. 11 wherein the depiction of the grain cart and the harvester 10 includes concentric target lines 84 around the graphical depiction of the spout of the unload conveyor 22 to assist the operator in aligning the unload conveyor 22 with the grain bin.

A second embodiment of the invention is identical to the first embodiment described above, except that the location of the receiving vehicle relative to the harvester 10 is used to automatically guide the harvester 10, the tractor, or both to align the grain bin of the receiving vehicle with the unload conveyor 22 during an unload operation.

A system according to the second embodiment of the invention comprises an agricultural harvester including a crop processor for reducing crop material to processed crop, an unload conveyor for transferring a stream of processed crop out of the agricultural harvester, an electromagnetic detecting and ranging module for detecting the location of an object relative to the agricultural harvester, and a camera for capturing images of an area within a field of view of the electromagnetic detecting and ranging module and generating image data. The system further comprises one or more computing devices for receiving first data from the electromagnetic detecting and ranging module, the first data indicating the location of an object relative to the agricultural harvester, receiving image data from the camera, using the image data to determine whether the object is a receiving vehicle, and if the object is a receiving vehicle, generating automated navigation data based on the first data and the image data, the automated navigation data to automatically control operation of at least one of the agricultural harvester and the receiving vehicle to align the unload conveyor with a grain bin of the receiving vehicle.

Automated guidance of a machine involves generating or acquiring a target travel path known as a wayline, determining a geographic location of the machine, comparing the machine's geographic location to the location of the wayline and automatically steering the machine to travel along the wayline. The wayline may be generated by an operator of the machine by, for example, designating a starting point and an ending point of the wayline or designing a start point and a direction of travel. The wayline may also be stored and retrieved from a previous operation, received from another agricultural machine or imported from an external computer device, such as an external computer running farm management software that generates the wayline. The wayline is represented by two or more geographic locations or points known as waypoints. The automated guidance system is part of the machine and is included in the electronic system described above. Automated guidance software stored in the storage component, for example, enables the controller to determine or acquire the wayline, determine the machine's location using the position determining component, compare the machine's location with the location of the wayline, and automatically steer the machine using data from the one or more sensors to determine a steering angle of the wheels and using the actuators to change the steering angle of the wheels, if necessary, to steer the machine to or along the wayline.

During operation the machine's geographic location is continuously determined using a GNSS receiver, and the location of a navigation point of the machine (for example, a point located between the rear wheels of a tractor or between the front wheels of a harvester) is continuously compared with the location of the wayline. Steering of the machine is automatically controlled so that the navigation point of the machine follows the wayline.

The automated guidance system of the tractor 34 automatically aligns the grain bin 38 of the grain cart 36 with the unload conveyor 22 by generating a wayline that corresponds to a path that will place the grain bin 38 beneath the spout 24 of the unload conveyor 22. By way of example, the one or more computing devices may determine from the data generated by the modules 28 and the camera 32 that the lateral distance of the grain cart 36 from the harvester 10 is seven meters. If the lateral distance required to align the grain bin 38 with the spout 24 is six meters, the automated guidance system of the tractor 34 generates a wayline that is one meter closer to the harvester 10 and steers the tractor 34 to follow the wayline. Similarly, if the one or more computing devices determine that the lateral distance is four meters, the automated guidance system of the tractor 34 generates a wayline that is two meters further away from the harvester 10 and steers the tractor 34 to follow the wayline.

The automated guidance system further controls the propulsion of the tractor 34 to shift the tractor's position forward or rearward relative to the harvester 10 to maintain a proper longitudinal position of the tractor 34 relative to the harvester 10 such that the grain cart 36 presents a proper front to back position relative to the unload conveyor 22. If the one or more computing devices determines that the grain cart 36 has a negative longitudinal offset relative to the harvester 10 (in other words, the position of the grain cart 36 is behind a desire position relative to the harvester 10) the automated guidance system causes the tractor 34 to speed up until it is at the desire position, then causes it to match the speed of the harvester 10. Similarly, if the one or more computing devices determines that the grain cart 36 has a positive longitudinal offset relative to the harvester 10 (in other words, the position of the receiving vehicle is ahead of a desire position relative to the harvester 10) the automated guidance system causes the tractor 34 to slow down until it is at the desire position, then causes it to match the speed of the harvester 10.

Figure 13:
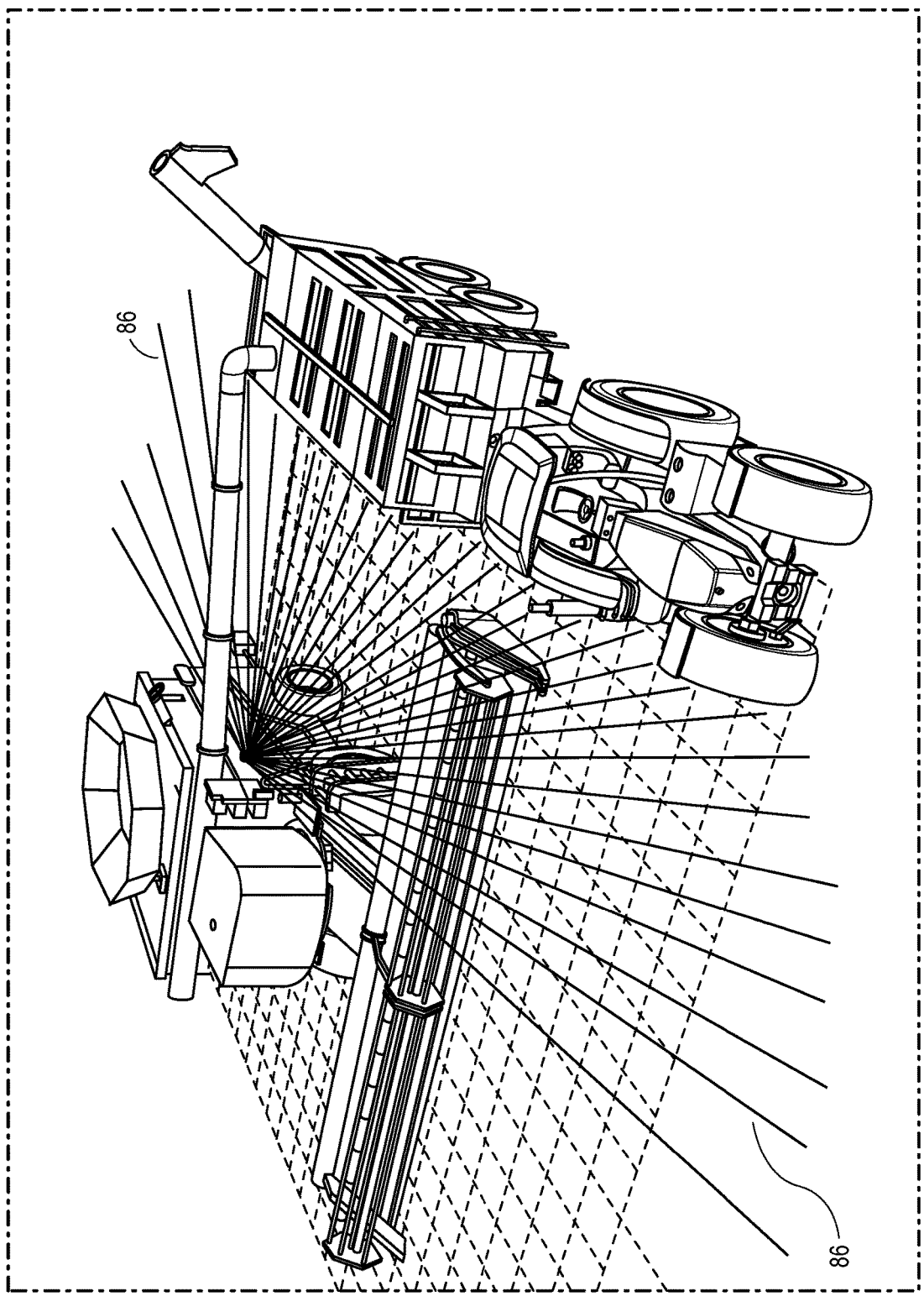
FIG. 13 is a perspective view of the agricultural harvester and receiving vehicle of FIG. 3 illustrating a scan area of an alternative embodiment of the first electromagnetic detecting and ranging module on the agricultural harvester.
Figure 14:
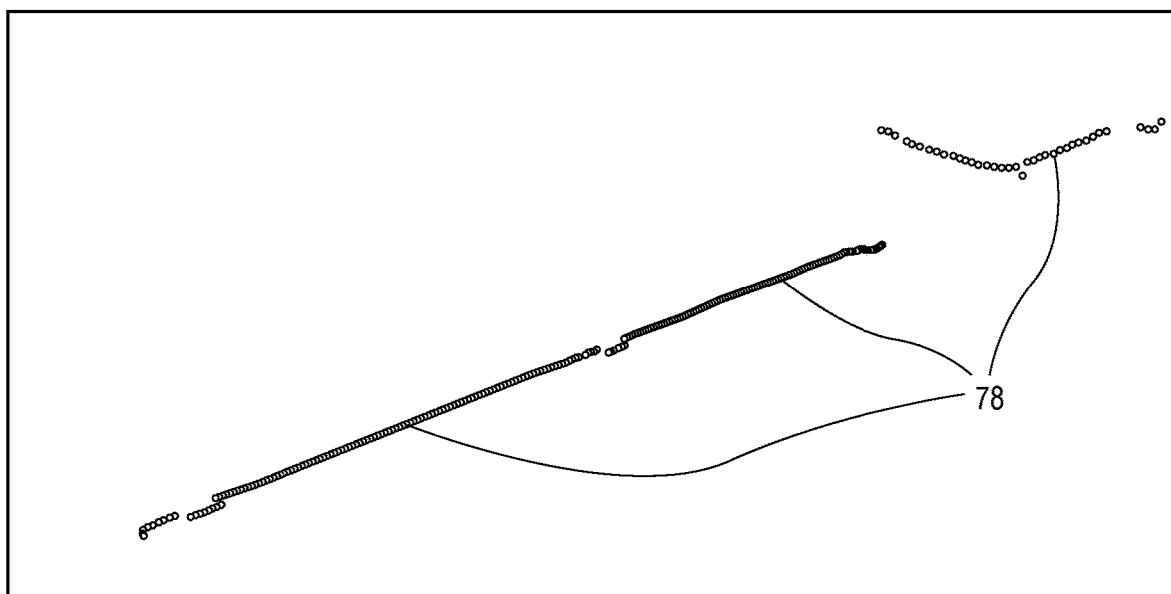
FIG. 14 illustrates data points collected by the electromagnetic detecting and ranging module of FIG. 13.

A third embodiment of the invention is identical to either of the first or second embodiments of the invention, describe above, except that the electromagnetic detecting and ranging module 28 includes a two-dimensional LiDAR sensor. In this embodiment of the invention the scan area 76 of the module 28 is planar, as illustrated in FIG. 13. This generates a data set 78 within the plan defined by the scan area 76, as illustrated in FIG. 14.

Figure 15:
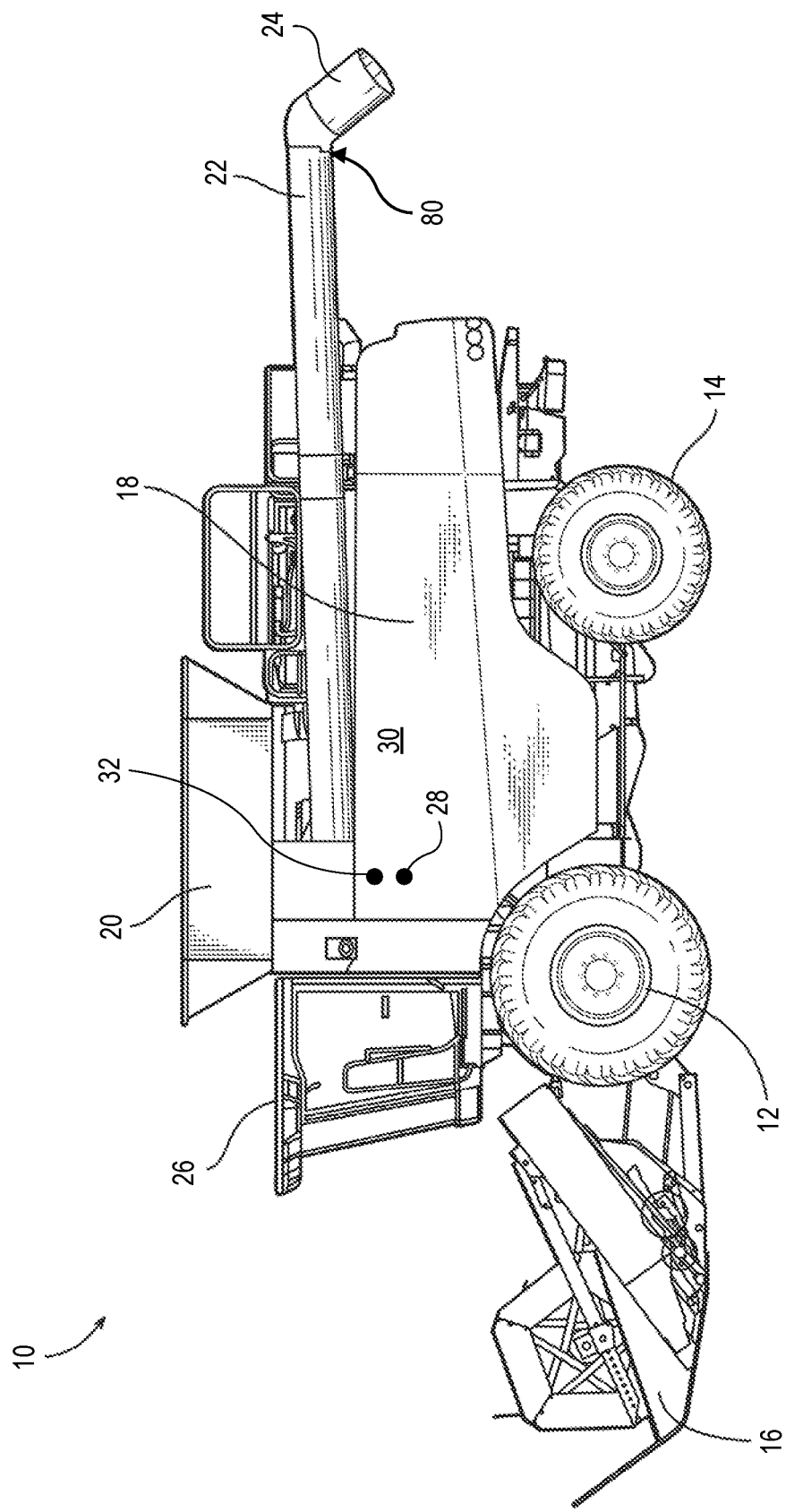
FIG. 15 is an agricultural harvester constructed in accordance with another embodiment of the invention.
Figure 16:
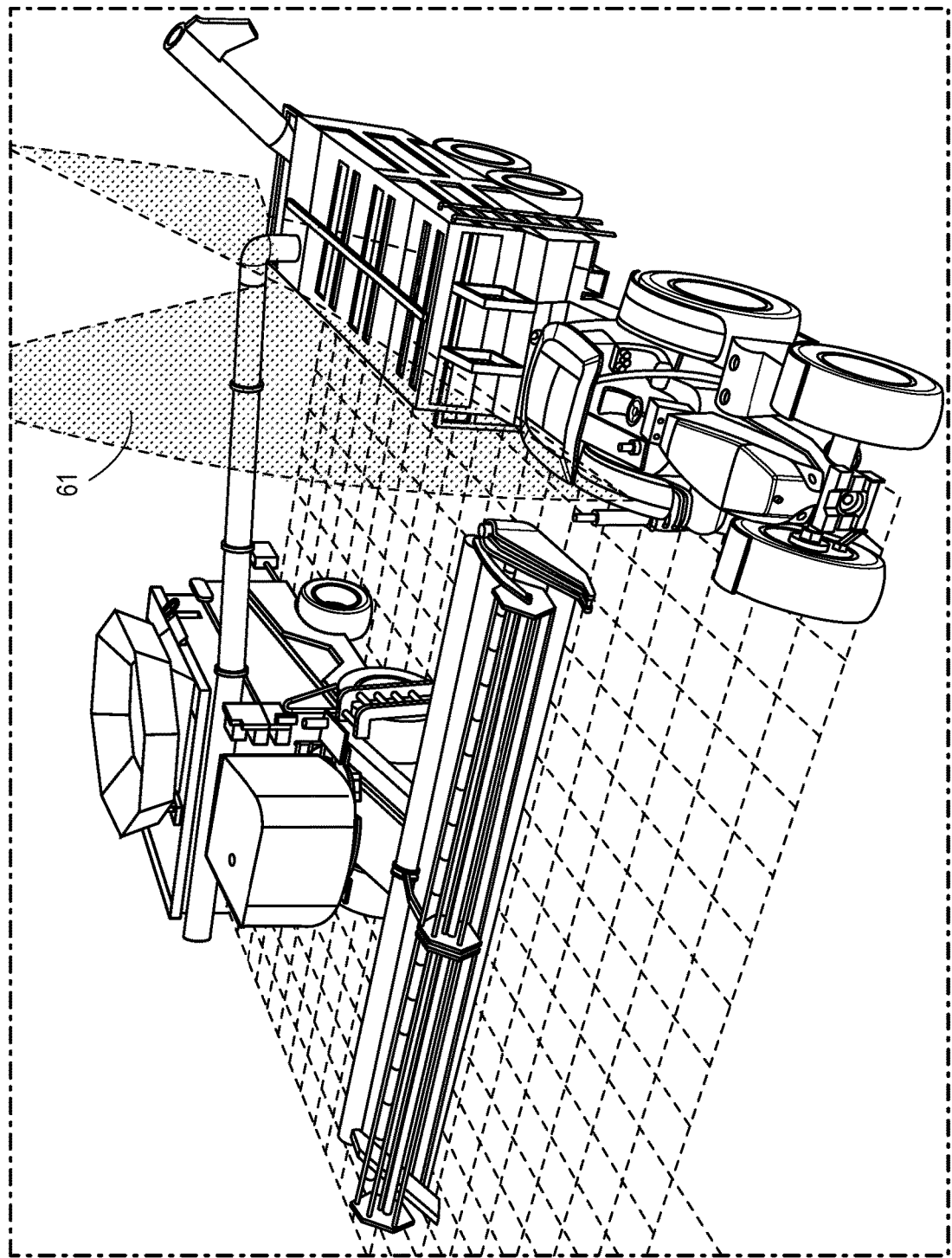
FIG. 16 is a perspective view of the agricultural harvester and receiving vehicle of FIG. 3 illustrating a scan area of a second electromagnetic detecting and ranging module on the agricultural harvester.

A fourth embodiment of the invention is identical to the first or second embodiments, described above, except that the harvester 10 includes a second electromagnetic detecting and ranging module 80 as illustrated in FIG. 15. The second electromagnetic detecting and ranging module 80 is located at or near an end of the unload conveyor 22 corresponding to the spout 24 and distal the body 18 of the harvester 10. The module 80 includes a two-dimensional light detecting and ranging (LiDAR) scanner positioned to scan an area extending downwardly from the end of the unload conveyor 22 that is perpendicular or approximately perpendicular to a longitudinal axis of the unload conveyor 22. This scan area includes an area inside the grain bin 38 of the receiving vehicle when the grain bin 38 is positioned below the spout 24 of the unload conveyor 22. FIG. 16 illustrates a scan area of the module 32 with a grain cart within the scan area.

Figure 17:
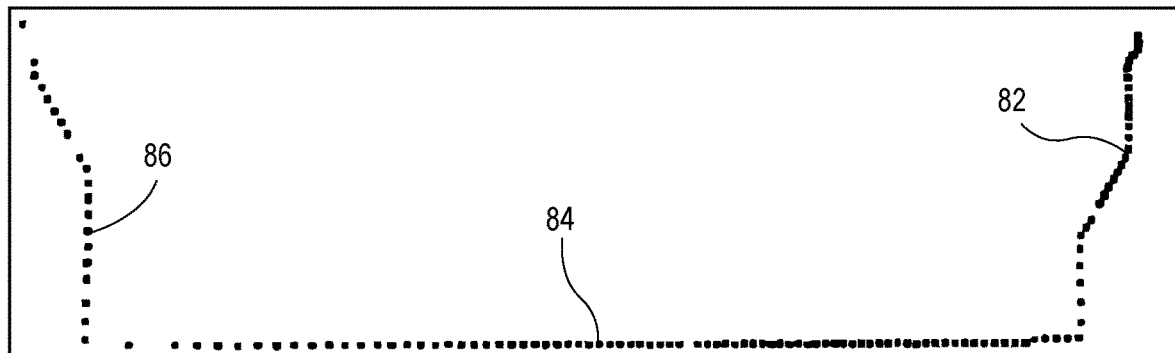
FIG. 17 illustrates data points collected by the second electromagnetic detecting and ranging sensor when placed over an empty receiving vehicle.
Figure 18:
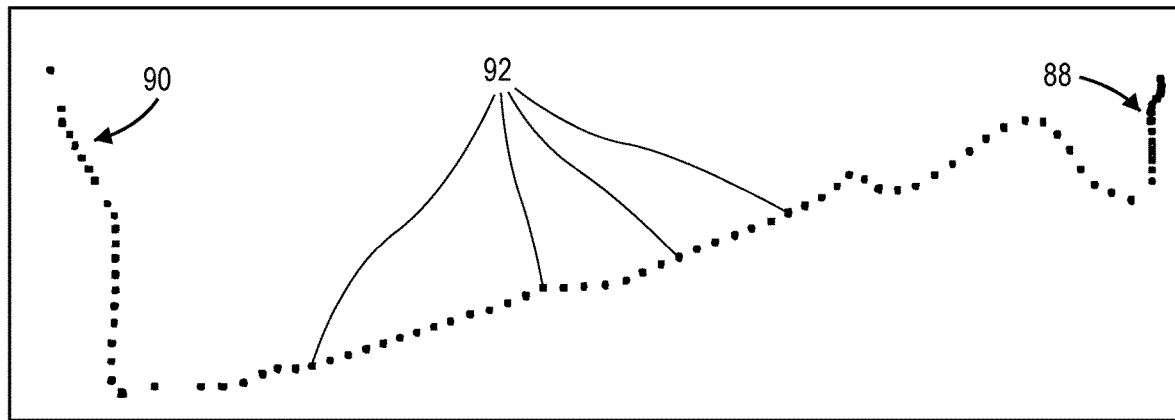
FIG. 18 illustrates data points collected by the second electromagnetic detecting and ranging sensor when placed over a partially filled receiving vehicle.

The module 80 includes a two-dimensional light detecting and ranging (LiDAR) scanner that generates a plurality of data points within the plane corresponding to the scan area, each data point including a distance value corresponding to a distance from the module 32. As with the data from the first module 28, the one or more computing devices process the data from the module 80 to identify patterns. A series of data points generated by the module 80 when the grain bin of the receiving vehicle is empty is illustrated in FIG. 17. A first pattern 82 of the data points corresponds to an interior surface of a front wall of the grain bin, a second pattern 84 corresponds to an interior surface of a floor of the grain bin and a third pattern 86 corresponds to an interior surface of a rear wall of the grain bin. A series of data points generated by the module 80 when the grain bin is partially filled is illustrated in FIG. 18. In FIG. 18 the generally vertical patterns near the front 88 and the near the rear 90 of the data set correspond to the front and rear walls of the grain bin while the data points 92 corresponding to the generally diagonal angled and curved patterns between the front and rear walls correspond to a top surface of a quantity of grain heaped in the grain bin.

The one or more computing devices use this data generated by the module 80 to determine the fill level of the grain cart 36, the distribution of grain (or other processed crop material) within the grain cart 36, or both. To determine the fill level of the grain cart 36 the one or more computing devices identify data points 92 corresponding to grain (verses data points corresponding to walls or the floor of the grain bin), determine a fill height of each of the data points corresponding to grain, and then average the fill height of the data points corresponding to grain to generate an average fill level of the grain bin.

To identify data points corresponding to grain the one or more computing devices may use patterns in the data, receiving vehicle location information generated using data from the module 28, or both. The one or more computing devices may use patterns in the data by identifying patterns corresponding to certain parts of the grain bin such as a front wall (for example, pattern 72), rear wall (for example, pattern 86) and floor (for example, pattern 84) or a combination of two or more of these features. In the collection of data illustrated in FIG. 17, for example, the walls and floor are identified from the data patterns 82, 84, 86 and it is determined that none of the data points correspond to grain. In the collection of data illustrated in FIG. 18, the front wall and the rear wall are identified from the data patterns 88, 90. When the data patterns detected in FIG. 18 are compared to a data pattern corresponding to an empty grain bin (FIG. 17) it is determined that most of the data points between the front wall and the rear wall do not match the expected location and shape of a data pattern corresponding to the floor and, therefore, correspond to grain. The one or more computing devices then determine a fill height of each of the data points corresponding to grain, wherein the fill height is the distance of the data point from the floor of the grain bin to the data point. The fill height may be determined by comparing the location of the data point to the anticipated location of the floor. In the illustrated data patterns, this may involve comparing the data points 92 to data points 84. Once the fill height is determined for all of the data points an average fill height of all of the data points is determined and used as the overall grain bin fill level, as stated above.

The one or more computing devices may also use receiving vehicle location information from the module 28 to determine or assist in determining the fill level of the grain bin of the receiving vehicle. If the location of the receiving vehicle relative to the harvester 10 is known the vehicle's location relative to the unload conveyor may be used to determine the height of the data points corresponding to grain relative to the floor of the grain bin by comparing the location of the data point to the location of the floor of the grain bin determined using the location of the receiving vehicle.

Additionally or alternatively the one or more computing devices determine a distribution of grain in the grain bin. Using the data pattern illustrated in FIG. 18, for example, the fill height of each data point 92 is determined as explained above and a fill height value and longitudinal (distance from the rear wall or from the front wall) is stored for each data point. That information may then be used by the one or more computing devices to depict a fill level at various locations in the grain bin in a graphical user interface, as discussed below.

While the description above describes a technique of determining the fill level and distribution of crop material in the receiving vehicle by comparing differences between a measured surface of the crop with an anticipated floor of the receiving vehicle, it will be appreciated that other techniques may be used to determine the fill level and the distribution. The one or more computers may compare the measured surface of crop material with a top of the receiving vehicle, for example. The top of the receiving vehicle may be determined using the data 62 generated by the module 28, using the data 72, 74 generated by the module 32, using data provided by an operator or manufacturer of the grain cart 36, or a combination thereof.

The one or more computing devices may detect patterns in the data generated by the module 80 by comparing data generated by the module 80 with preexisting data corresponding to the receiving vehicle, as explained above with regards to module 28.

A visual representation of the fill level of the grain bin allows the operator to see whether or not the receiving vehicle is full and to estimate how much time is required to completely fill the receiving the vehicle. A visual representation of the distribution of crop in the grain bin allows the operator to see which portions of the grain bin are full and to adjust the position of the receiving vehicle relative to the unload conveyor 22 of the harvester 10 to fill portions of the grain bin with less grain.

Figure 19:
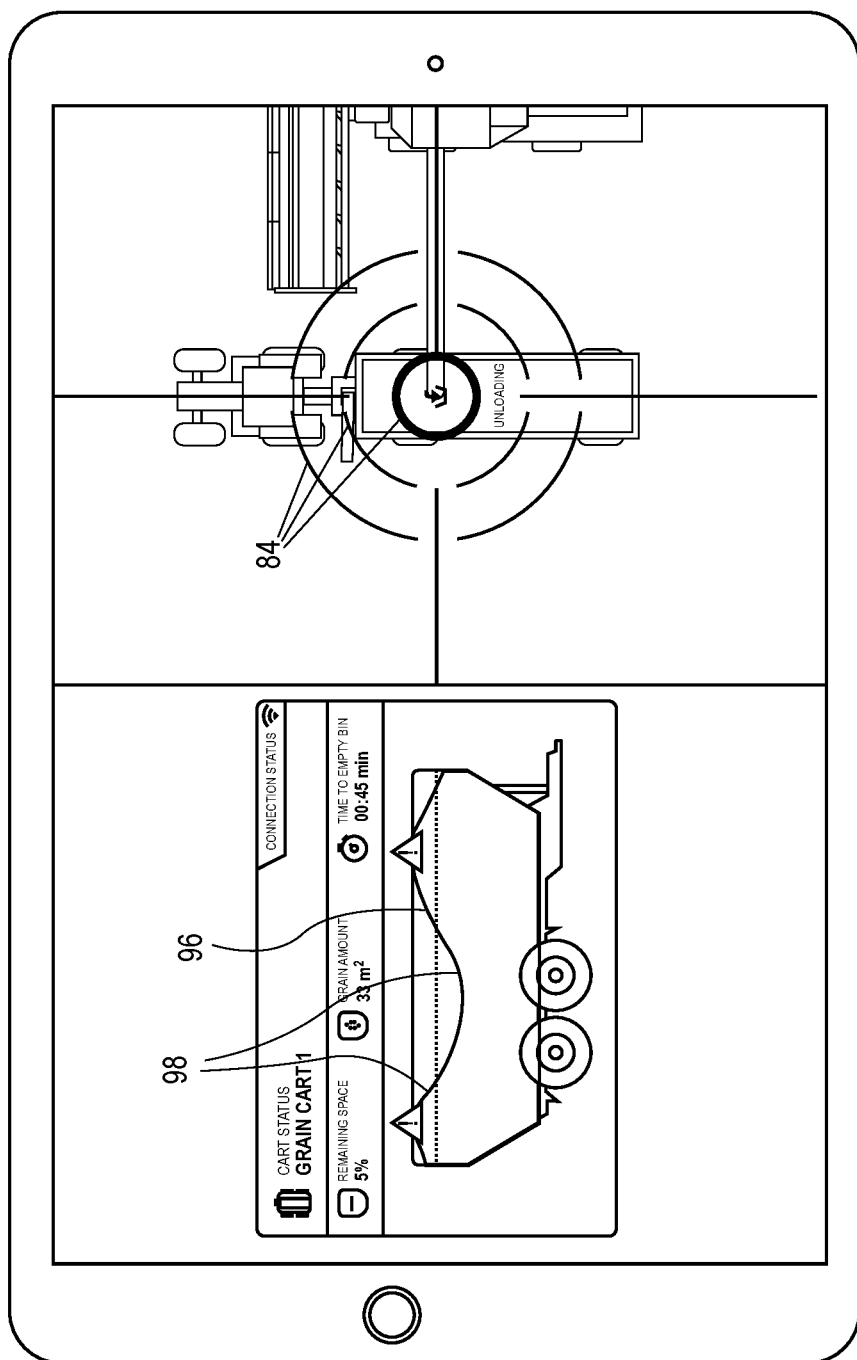
FIG. 19 illustrates a graphical user interface including a graphical representation of the relative positions of the agricultural harvester and the receiving vehicle and a fill level and distribution of contents of the receiving vehicle.

The fill level and distribution of the grain are also presented to the operator via the graphical user interface via an image such as that depicted in FIG. 19. The straight line 96 depicts the fill level of the grain bin 38 if the grain in the bin were evenly distributed. The curved line 98 depicts the distribution of the grain enabling the operator to adjust the position of the grain bin 38 relative to the unload conveyor 22 to fill areas of the grain bin where the level of the grain is lower.

Figure 20:
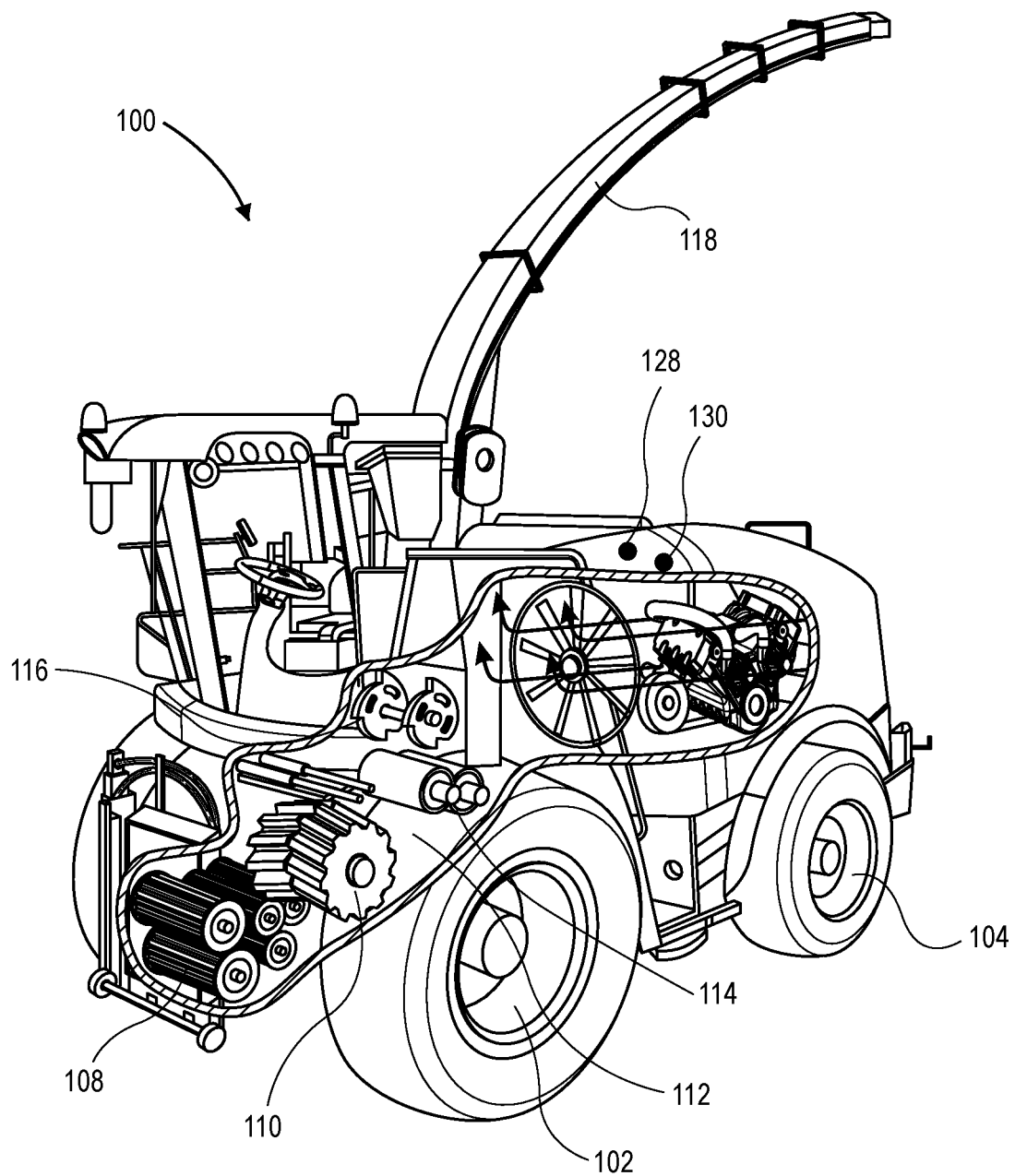
FIG. 20 is another agricultural harvester constructed according to embodiments of the invention in the form of a forage harvester.

In the embodiments described above the harvester is a combine harvester. The harvester may also be a forage harvester, such as the self-propelled forage harvester 100 illustrated in FIGS. 20 and 21. The forage harvester 100 is supported by front 102 and rear 104 wheels. The forage harvester 100 connects to a header 106 suitable for harvesting maize, but may also be equipped with a windrow pick-up header or other type of header. The header 106 is provided for severing or picking up the crop off the ground and directing it to a series of feed rollers 108 that compact the raw crop material and advance it to one or more chopping drums 110. The chopped crop material follows a drum floor 112 to roller crackers 114 that crack grain kernels. From there the processed crop material is blown by a discharge blower 116 through a discharge chute 118 into a receiving vehicle, such as a silage wagon 120 pulled by a tractor 122. As used herein, the feed rollers 108, chopping drums 110 and roller crackers 114 constitute a crop processor that takes raw crop material (plants or portions of plants cut or picked up from the field) and reduce the raw crop material to processed crop material (chopped plant matter). Furthermore, the discharge chute 118 is a type of unload conveyor as used herein.

In operation the forage harvester 100 advances through a field cutting the crop 124 standing in the field and processes the crop as explained above. The processed crop is transferred from the forage harvester 100 to the wagon 120 by way of the discharge chute 118. A stream of processed crop 126 is blown through the chute 188 into the wagon 120. The tractor 122 and wagon 120 follow the forage harvester 100 through the field.

The forage harvester 100 includes an onboard electronic system with similar components and architecture to the system 42 described above including a controller, position determining device, user interface, sensors, actuators, storage components, input/output ports, a communications gate, an electromagnetic detecting and ranging module 128 and a camera 130. The module 128 and camera 130 may function in a similar or identical manner to the module 28 and camera 32 described above, along with one or more computing devices, to detect and track a location of a receiving vehicle (such as the wagon 120) and at least one of the fill level and content distribution of crop material within the receiving vehicle. The data collected by the module 128 and the camera 130 is used to generate a graphical representation of the unload conveyor 116 of the harvester 100 and the receiving vehicle that is presented to an operator of either the harvester 100 or the tractor 122 by way of a graphical user interface as explained above. Alternatively or additionally, the data collected by the module 128 and camera 130 may be used to generate guidance data used by at least one of the harvester 100 and the receiving vehicle to automatically guide at least one of the vehicles to maintain proper alignment of the unload conveyor 116 with the receiving vehicle.

Figure 21:
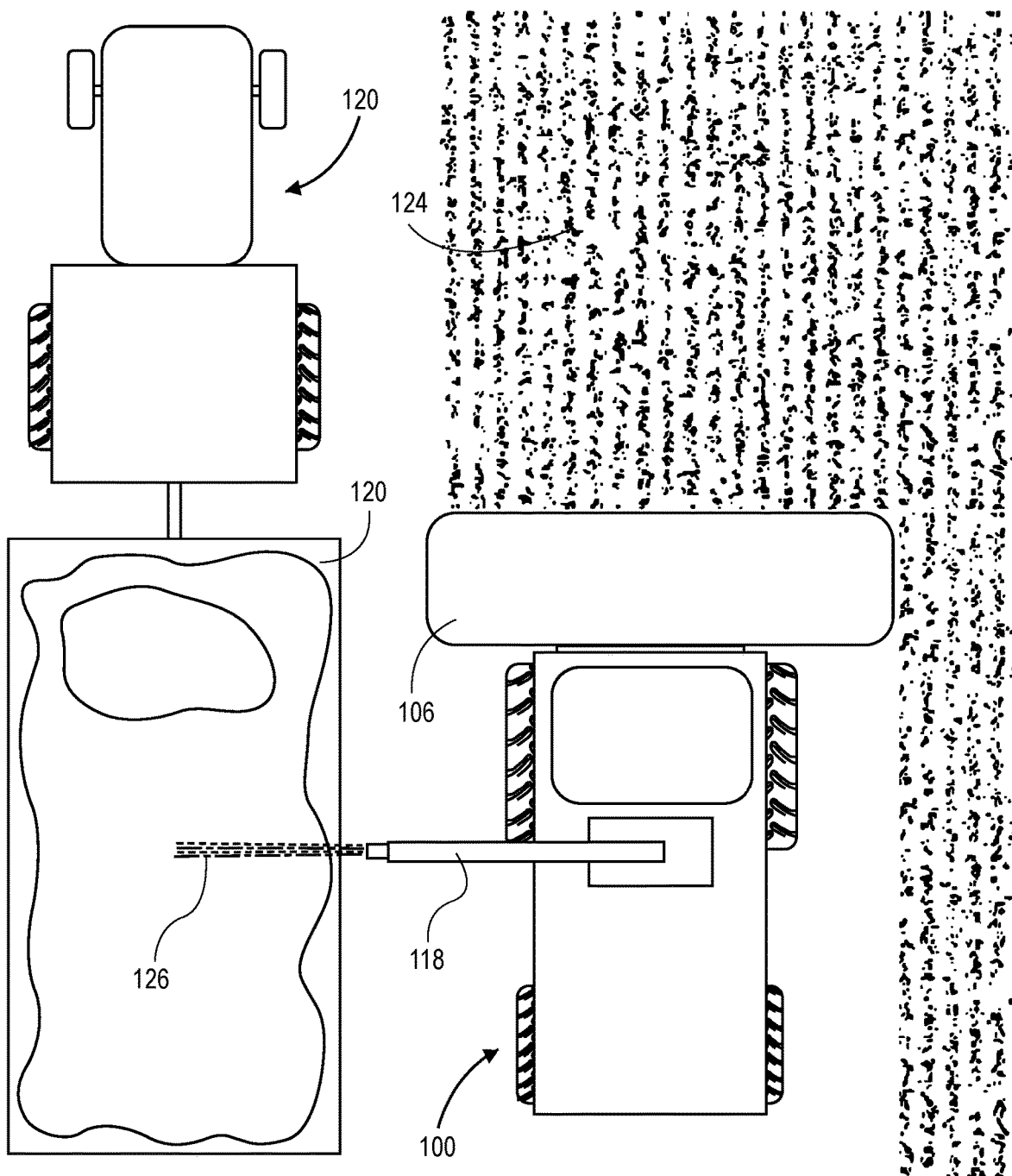
FIG. 21 illustrates the agricultural harvester of FIG. 20 harvesting crop and transferring a stream of processed crop into a receiving vehicle.

As used herein, an "unload operation" includes transferring processed crop from a forage harvester to a silage wagon as illustrated in FIG. 21, and "grain cart" and "grain bin" include silage wagon and the bin of a silage wagon.

Figure 22:
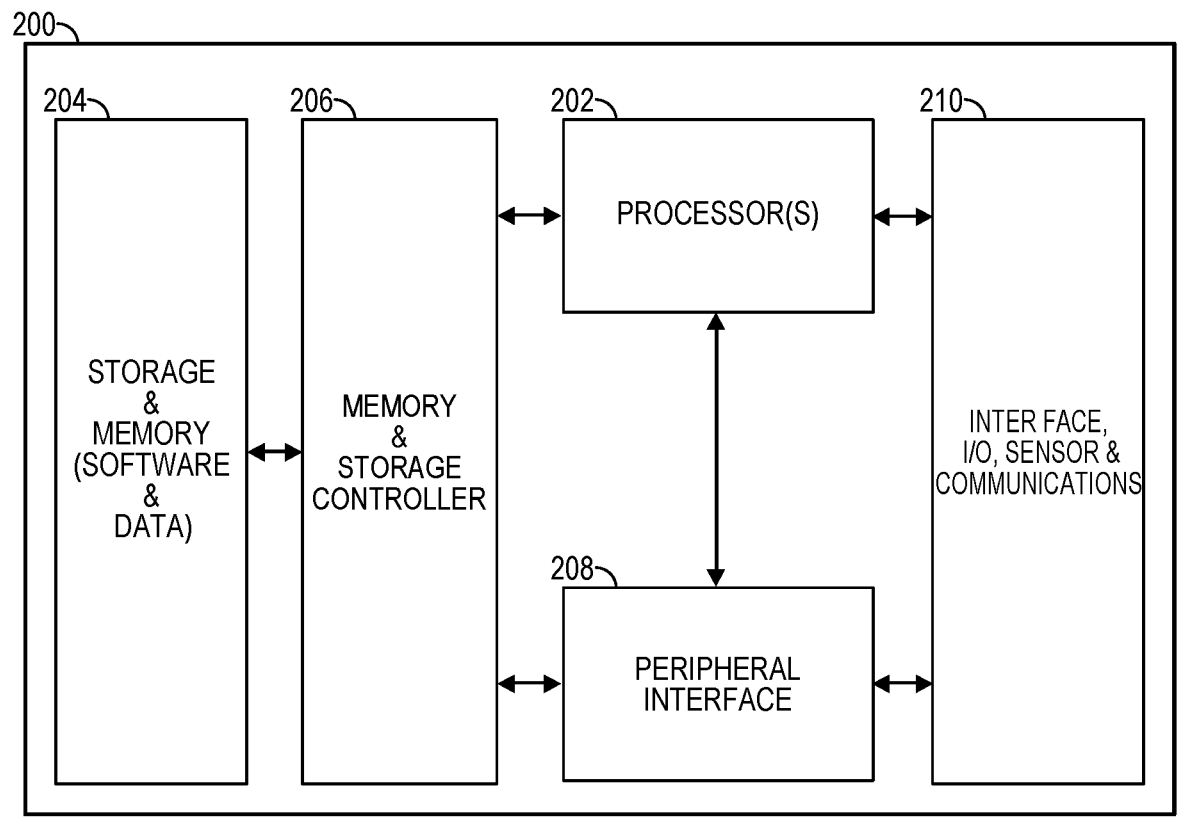
FIG. 22 is a block diagram of certain components of a portable electronic device.

A schematic diagram of certain components of a portable electronic device 200 is illustrated in FIG. 22 and includes one or more computer processors 202, one or more memory and storage components 204, memory and storage controller circuitry 206, peripheral interface circuitry 208 and other hardware/circuitry 210 associated with user interface(s) (for example, a graphical user interface), input/output, sensors and communications (for example, wireless or wired network communications). The memory and storage component 204 stores computer software executable by the processor(s) 202, such as an operating system and applications, as well as data. The memory and storage controller 206 controls access to and communication with the memory 204 by the processor(s) 202 and the peripheral interface 208. When a software application is installed or run on the portable electronic device 200 the executable computer instructions, as well as the data, associated with the app are stored in the storage and memory components and executed by the processor(s). The processor(s) 202, the peripheral interface 208 and/or the hardware and circuitry 210 associated with the interface, I/O, sensors and communications enable a human-machine interface such as a touchscreen through which a user interacts with the device. The processor(s) 202, the peripheral interface 208 and/or the hardware and circuitry 210 associated with the interface, I/O, sensors and communications also enable communications with an external communications or computer network or with an external machine, such as the harvester 10.

Although the invention has been described with reference to the preferred embodiment illustrated in the attached drawing figures, it is noted that equivalents may be employed and substitutions made herein without departing from the scope of the invention as recited in the claims.

The claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. A system comprising:
    an agricultural harvester including
        a crop processor for reducing crop material to processed crop,
        an unload conveyor for transferring a stream of processed crop out of the agricultural harvester,
        an electromagnetic detecting and ranging module for detecting the location of an object relative to the agricultural harvester, and
        a camera for capturing images of an area within a field of view of the electromagnetic detecting and ranging module and generating image data; and
    one or more computing devices for
        receiving first data from the electromagnetic detecting and ranging module, the first data indicating the location of an object relative to the agricultural harvester,
        receiving image data from the camera,
        using the image data to determine whether the object is a receiving vehicle, and
        if the object is a receiving vehicle, generating automated navigation data based on the first data and the image data, the automated navigation data to automatically control operation of at least one of the agricultural harvester and the receiving vehicle to align the unload conveyor with a grain bin of the receiving vehicle.

2. The system as set forth in claim 1, the electromagnetic detecting and ranging module performing a two-dimensional scan.

3. The system as set forth in claim 1, the electromagnetic detecting and ranging module performing a three-dimensional scan.

4. The system as set forth in claim 1,
    the agricultural harvester further comprising a second electromagnetic detecting and ranging module for detecting at least one of a fill level and a distribution of crop in the receiving vehicle;
    the one or more computing devices further configured to
        receive second data from the second electromagnetic detecting and ranging module, the second data indicating at least one of a fill level and a distribution of crop in the grain bin of the receiving vehicle, and
        if the vehicle is a receiving vehicle, generate the automated navigation data based on the first data, the second data and the image data.

5. The system as set forth in claim 4, the second electromagnetic detecting and ranging module performing a two-dimensional scan.

6. The system as set forth in claim 4, the second electromagnetic detecting and ranging module being placed at an end of the unload conveyor distal a body of the agricultural harvester.

7. The system as set forth in claim 4, the one or more computing devices further configured to generate the automated navigation signals so that the unload conveyor is aligned with a portion of the receiving vehicle where a crop level in the grain bin of the receiving vehicle is lowest.

8. The system as set forth in claim 1, the electromagnetic detecting and ranging module including a light detecting and ranging (LiDAR) module.

9. The system as set forth in claim 1, the electromagnetic detecting and ranging module including a radio detecting and ranging (RADAR) module.

10. The system as set forth in claim 1, the electromagnetic detecting and ranging module being placed on a top of an operator cabin of the agricultural harvester.

11. The system as set forth in claim 1, the electromagnetic detecting and ranging module being placed on a side of a body of the agricultural harvester with a field of view to a side of the agricultural harvester.

12. The system as set forth in claim 11, the camera being placed on the side of the body of the agricultural harvester such that a field of view of the camera at least partially overlaps the field of view of the electromagnetic detecting and ranging module.

13. The system as set forth in claim 1, the one or more computing devices further configured to
    use the first data to determine whether there is an object present in the field of view of the electromagnetic detecting and ranging device with at least one characteristic of a receiving vehicle; and
    only if there is an object present in the field of view of the electromagnetic detecting and ranging device with at least one characteristic of a receiving vehicle
        use the image data to determine whether the object is a receiving vehicle, and
        if the object is a receiving vehicle, generate the automated navigation data.

14. The system as set forth in claim 1, the one or more computing devices configured to use the image data to determine whether the object is a receiving vehicle by comparing the image to a plurality of preexisting images and identifying similarities between the image data and at least one of the plurality of preexisting images.

15. A method comprising:
    detecting a location of an object relative to an agricultural harvester using an electromagnetic detecting and ranging module on the agricultural harvester;
    capturing images of an area within a field of view of the electromagnetic detecting and ranging module using a camera on the agricultural harvester and generating image data;
    receiving, using one or more computing devices, first data from the electromagnetic detecting and ranging module, the first data indicating the location of an object relative to the agricultural harvester;
    receiving, using the one or more computing devices, image data from the camera;

processing, using the one or more computing devices, the image data to determine whether the object is a receiving vehicle; and if the object is a receiving vehicle generating, using the one or more computing devices, automated navigation data based on the first data and the image data, the automated navigation data to automatically control operation of at least one of the agricultural harvester and the receiving vehicle to align an unload conveyor of the agricultural harvester with a grain bin of the receiving vehicle.

16. The method as set forth in claim 15, detecting at least one of a fill level and a distribution of crop in the receiving vehicle using a second electromagnetic detecting and ranging module;

receiving, using the one or more computing devices, second data from the second electromagnetic detecting and ranging module, the second data indicating at least one of a fill level and a distribution of crop in the grain bin of the receiving vehicle; and using the one or more computing devices to generate the automated navigation data based on the first data, the second data and the image data.

17. The method as set forth in claim 15, further comprising generating, using the one or more computing devices, the automated navigation signals so that the unload conveyor is aligned with a portion of the receiving vehicle where a crop level in the grain bin of the receiving vehicle is lowest.

18. The method as set forth in claim 15, further comprising:

determining, using the first data and the one or more computing devices, whether there is an object present in the field of view of the electromagnetic detecting and ranging module with at least one characteristic of a receiving vehicle; and only if there is an object present in the field of view of the electromagnetic detecting and ranging module with at least one characteristic of a receiving vehicle, using the one or more computing devices to use the image data to determine whether the object is a receiving vehicle, and if the object is a receiving vehicle, generate the automated navigation data.

19. The method as set forth in claim 15, the electromagnetic detecting and ranging module including a light detecting and ranging (LiDAR) module.

20. The method as set forth in claim 15, the electromagnetic detecting and ranging module including a radio detecting and ranging (RADAR) module.

* * * * *